(12) United States Patent
Nozato et al.

(10) Patent No.: US 10,167,198 B2
(45) Date of Patent: Jan. 1, 2019

(54) METHOD FOR PRODUCING FLAKE GRAPHITE, AND FLAKE GRAPHITE

(71) Applicant: SEKISUI CHEMICAL CO., LTD., Osaka, Osaka (JP)

(72) Inventors: Shoji Nozato, Osaka (JP); Akira Nakasuga, Osaka (JP); Hiroshi Yoshitani, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/374,835

(22) PCT Filed: Feb. 12, 2013

(86) PCT No.: PCT/JP2013/053247
§ 371 (c)(1),
(2) Date: Jul. 25, 2014

(87) PCT Pub. No.: WO2013/122045
PCT Pub. Date: Aug. 22, 2013

(65) Prior Publication Data
US 2014/0377161 A1 Dec. 25, 2014

(30) Foreign Application Priority Data

Feb. 14, 2012 (JP) .................. 2012-029797
Feb. 14, 2012 (JP) .................. 2012-029798
Aug. 24, 2012 (JP) .................. 2012-185052

(51) Int. Cl.
*C01B 32/225* (2017.01)
*C01B 31/04* (2006.01)

(52) U.S. Cl.
CPC ........ *C01B 31/0423* (2013.01); *C01B 32/225* (2017.08)

(58) Field of Classification Search
CPC .................................. C01B 31/0423
See application file for complete search history.

(56) References Cited

U.S. PATENT DOCUMENTS 4,557,974 A 12/1985 Tsukuda et al.
4,895,713 A 1/1990 Greinke et al.
(Continued)

FOREIGN PATENT DOCUMENTS

CN 101558457 A 10/2009
CN 101717081 A 6/2010
(Continued)

OTHER PUBLICATIONS

Vuluga, Daniela, et al. "Straightforward synthesis of conductive graphene/polymer nanocomposites from graphite oxide." Chemical Communications 47.9 (2011): 2544-2546.*
(Continued)

*Primary Examiner* — Richard M Rump
(74) *Attorney, Agent, or Firm* — Cheng Law Group, PLLC

(57) ABSTRACT

There is provided a method for producing relatively easily handleable exfoliated graphite by exfoliating graphite without complicated steps, and exfoliated graphite obtained by the method. A method for producing exfoliated graphite, comprising steps of preparing a composition which comprises graphite or primary exfoliated graphite and a polymer and in which the polymer is fixed to the graphite or primary exfoliated graphite; and pyrolyzing the polymer contained in the composition to exfoliate the graphite or primary exfoliated graphite and remove the polymer by pyrolysis.

20 Claims, 8 Drawing Sheets

(56) References Cited

U.S. PATENT DOCUMENTS

| | | | |
|---|---|---|---|
| 5,719,199 A * | 2/1998 | Wallace | C08J 9/0066 521/143 |
| 7,071,258 B1 * | 7/2006 | Jang | B82Y 30/00 423/445 B |
| 7,659,350 B2 | 2/2010 | Prud'Homme et al. | |
| 2006/0216222 A1 | 9/2006 | Jang | |
| 2008/0206124 A1 | 8/2008 | Jang et al. | |
| 2008/0279756 A1 | 11/2008 | Zhamu et al. | |
| 2009/0061312 A1 | 3/2009 | Zhamu et al. | |
| 2010/0055025 A1 | 3/2010 | Jang et al. | |
| 2010/0096595 A1 * | 4/2010 | Prud'Homme | B82Y 30/00 252/500 |
| 2011/0017587 A1 | 1/2011 | Zhamu et al. | |
| 2011/0045300 A1 | 2/2011 | Tamaoki et al. | |
| 2013/0296498 A1 * | 11/2013 | Nakasuga | C08F 2/44 525/330.3 |

FOREIGN PATENT DOCUMENTS

| | | | |
|---|---|---|---|
| JP | 58-69788 A | 4/1983 | |
| JP | 1-145311 A | 6/1989 | |
| JP | 2007-533818 A | 11/2007 | |
| JP | 2011-66057 A | 3/2011 | |
| JP | 2011-195432 A | 10/2011 | |
| JP | WO 2012105344 A1 * | 8/2012 | C08F 2/44 |
| WO | WO-2005/108057 A1 | 11/2005 | |
| WO | WO-2009/013931 A1 | 1/2009 | |
| WO | WO-2009/147771 A1 | 12/2009 | |
| WO | WO-2011/075158 A1 | 6/2011 | |
| WO | WO-2011/162727 A1 | 12/2011 | |
| WO | WO-2012/105344 A1 | 8/2012 | |

OTHER PUBLICATIONS

Jeong, Soon-Ki, et al. "AFM study of surface film formation on a composite graphite electrode in lithium-ion batteries." Journal of power sources 119 (2003): 555-560.*
Park, Jeong-Seok, et al. "Edge-exfoliated graphites for facile kinetics of delithiation." ACS nano 6.12 (2012): 10770-10775.*
Jeon, In-Yup, et al. "Wedging graphite into graphene and graphene-like platelets by dendritic macromolecules." Journal of Materials Chemistry 21.21 (2011):7820-7826.*
The First Office Action for the Application No. 201380007913.X from The State Intellectual Property Office of the People's Republic of China dated Jul. 28, 2015.
International Search Report for the Application No. PCT/JP2013/053247 dated May 21, 2013.
Written Opinion of the International Searching Authority (PCT/ISA/237) for Application No. PCT/JP2013/053247 dated May 21, 2013.
Supplementary European Search Report for the Application No. EP 13 74 9946 dated Nov. 6, 2015.
Written Opinion of the International Searching Authority (PCT/ISA/237) for the Application No. PCT/JP2013/053247 dated May 21, 2013 (English Translation mailed Aug. 28, 2014).
Taiwanese Office Action for the Application No. 102105617 dated May 5, 2016.
Taiwanese Office Action for the Application No. 102105617 dated Dec. 2, 2016.
European Office Action for the Application No. 13 749 946.3 dated Jul. 19, 2017.
European Office Action for the Application No. 13 749 948.3 dated May 23, 2018.

* cited by examiner

[FIG. 1]
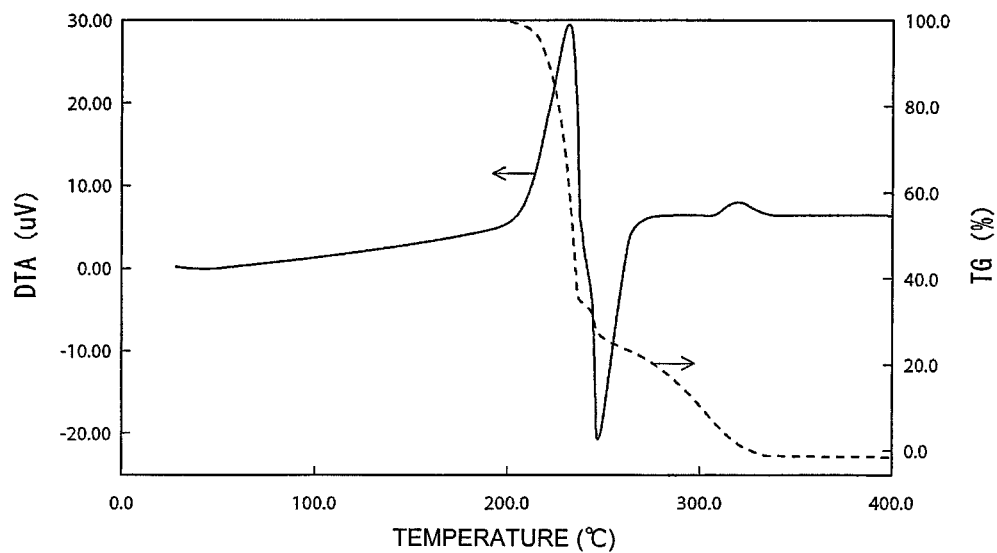
[FIG. 2]
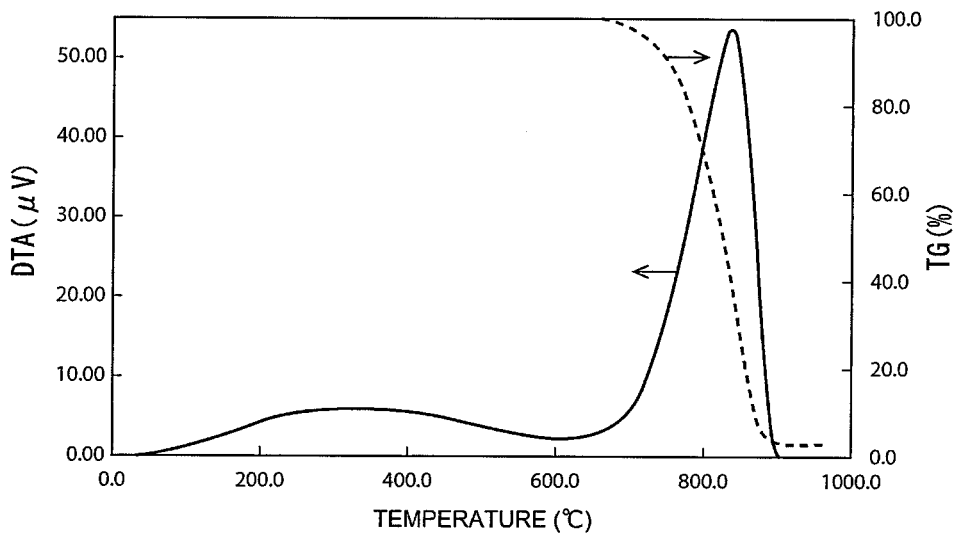

[FIG. 3]
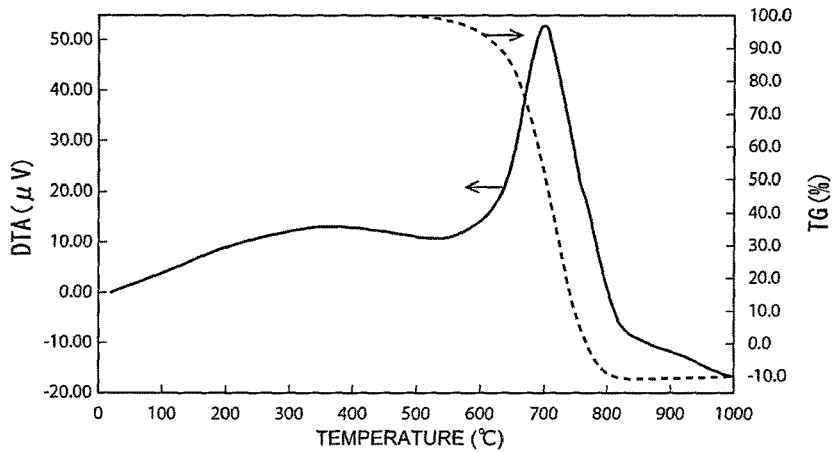
[FIG. 4]
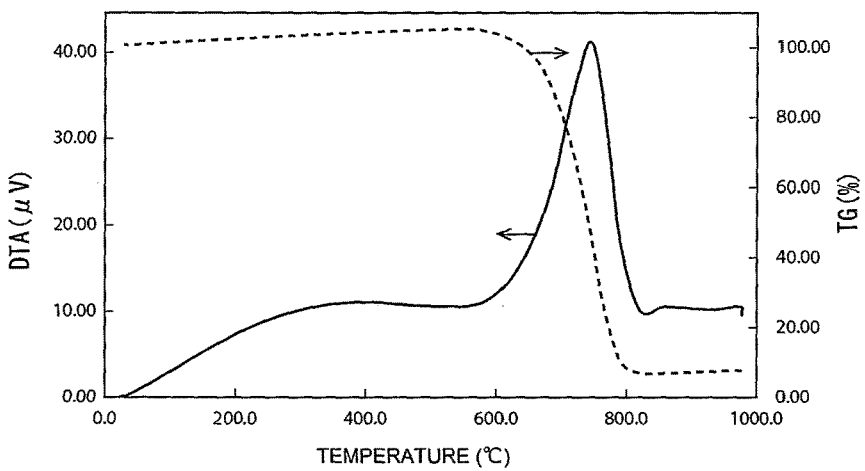
[FIG. 5]
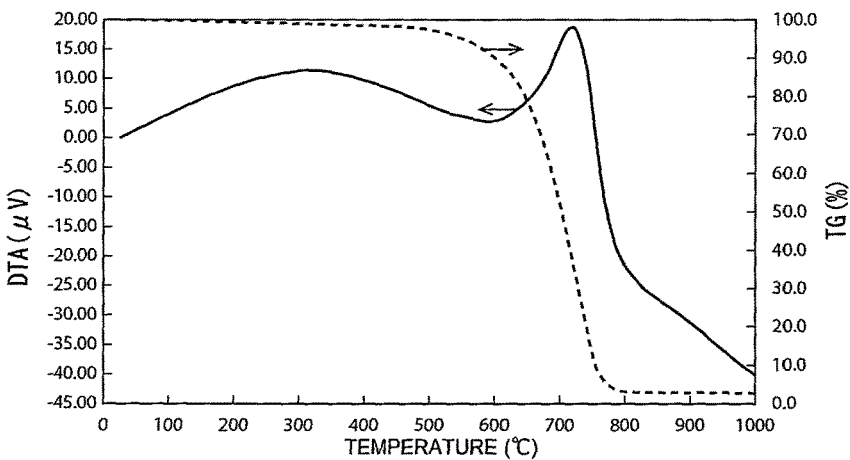

[FIG. 6]
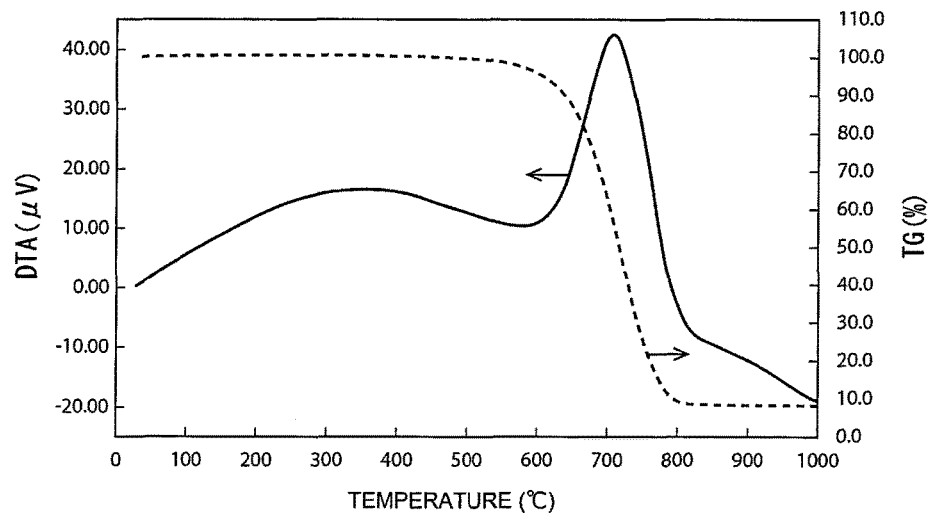
[FIG. 7]
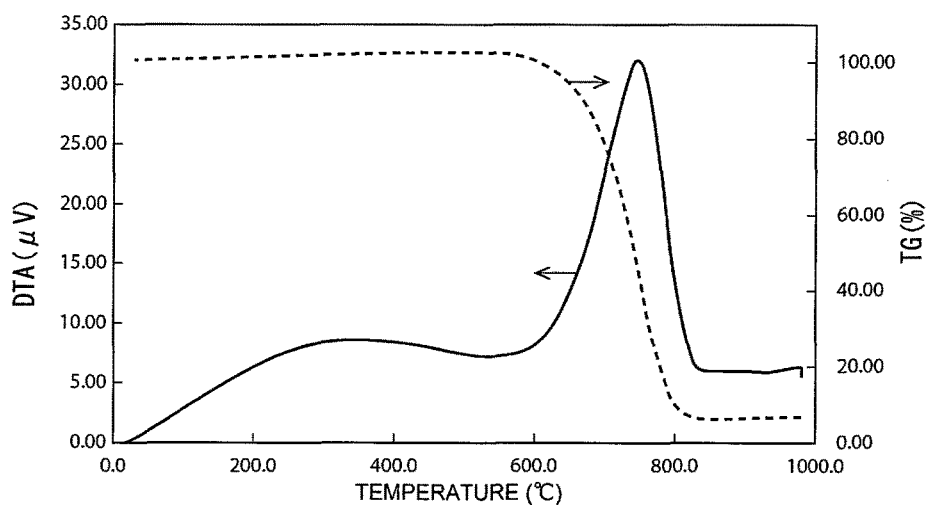

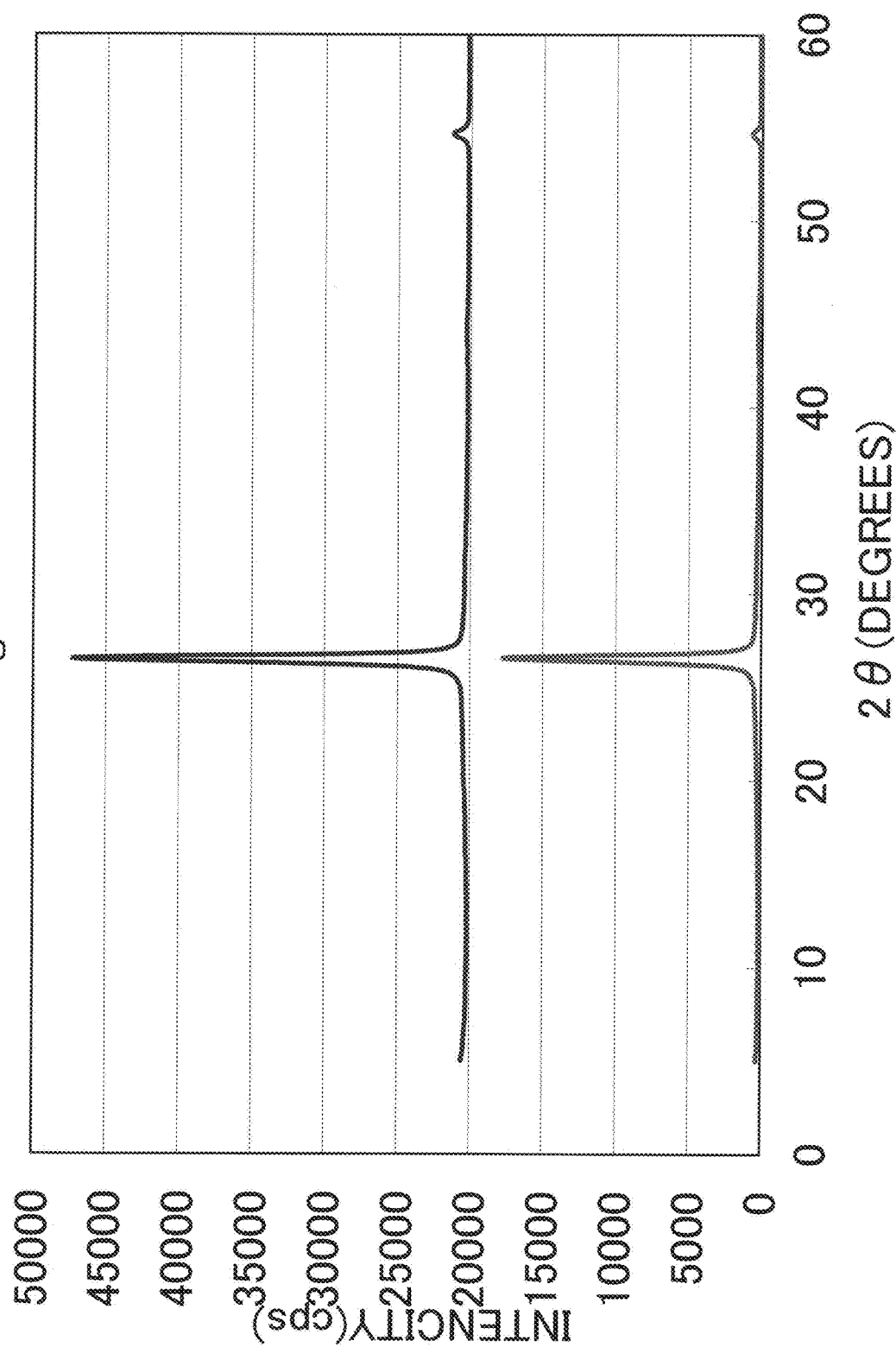

[FIG. 10]
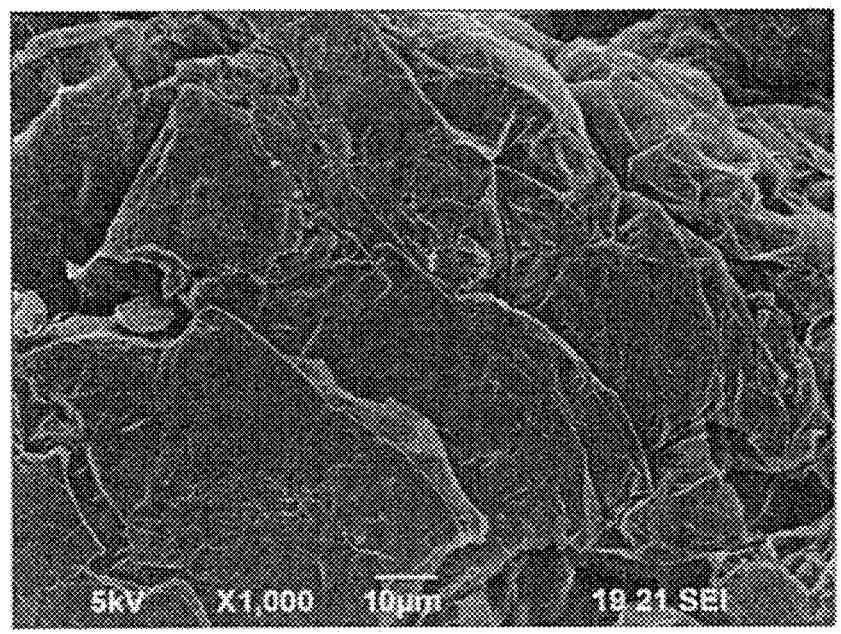
[FIG. 11]
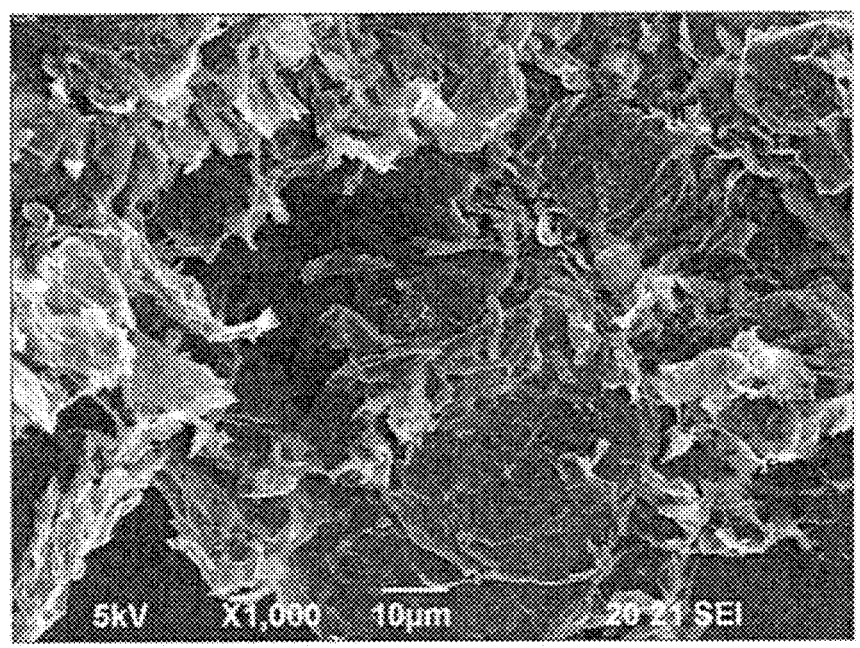

[FIG. 12]
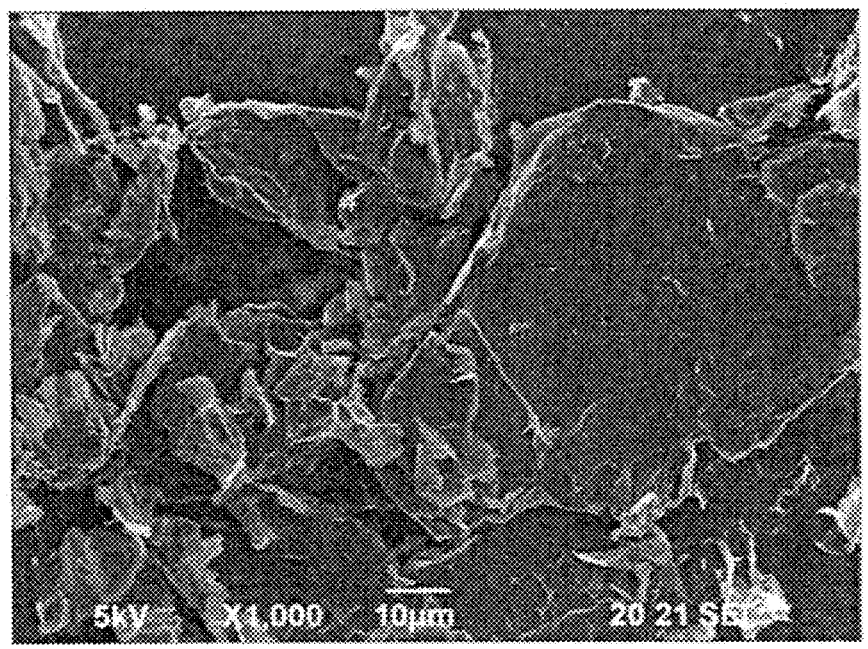
[FIG. 13]
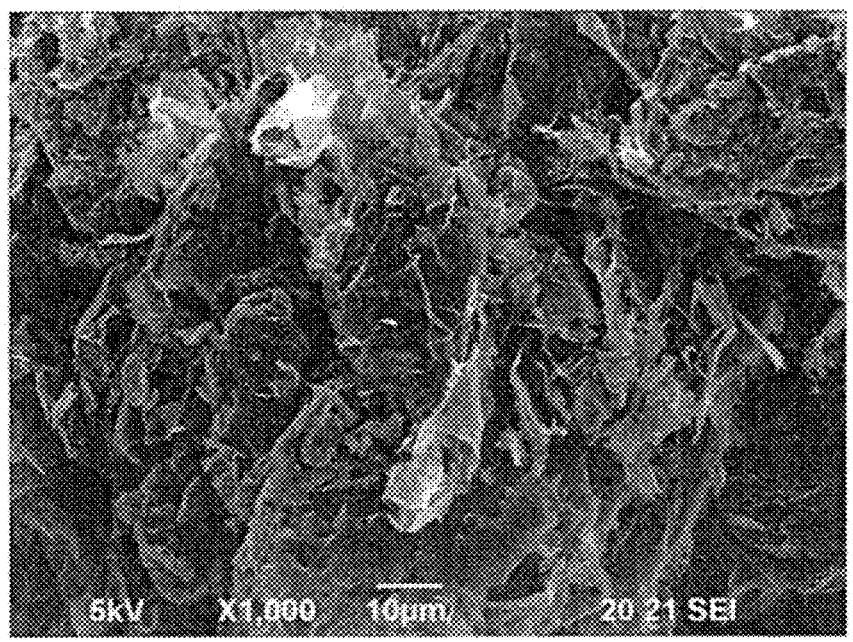

[FIG. 14]
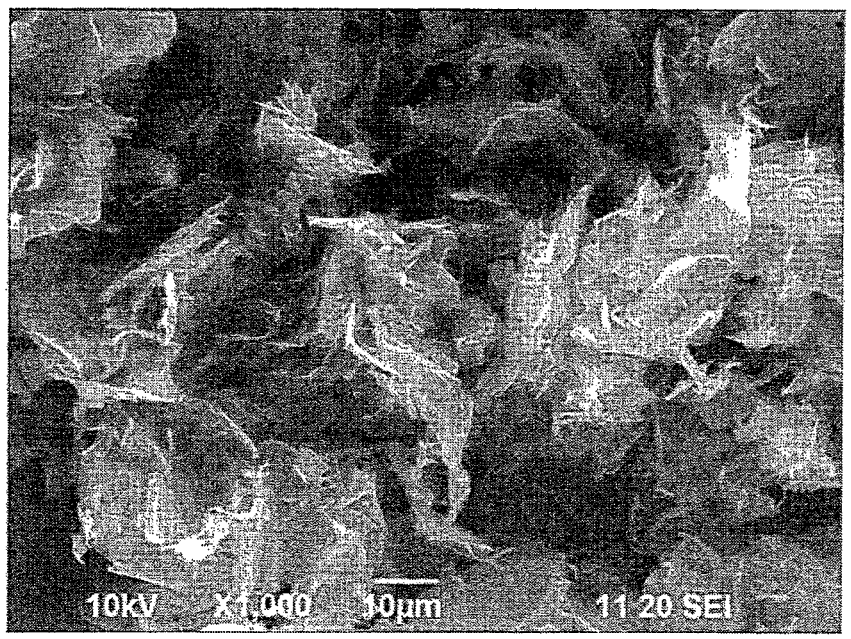
[FIG. 15]
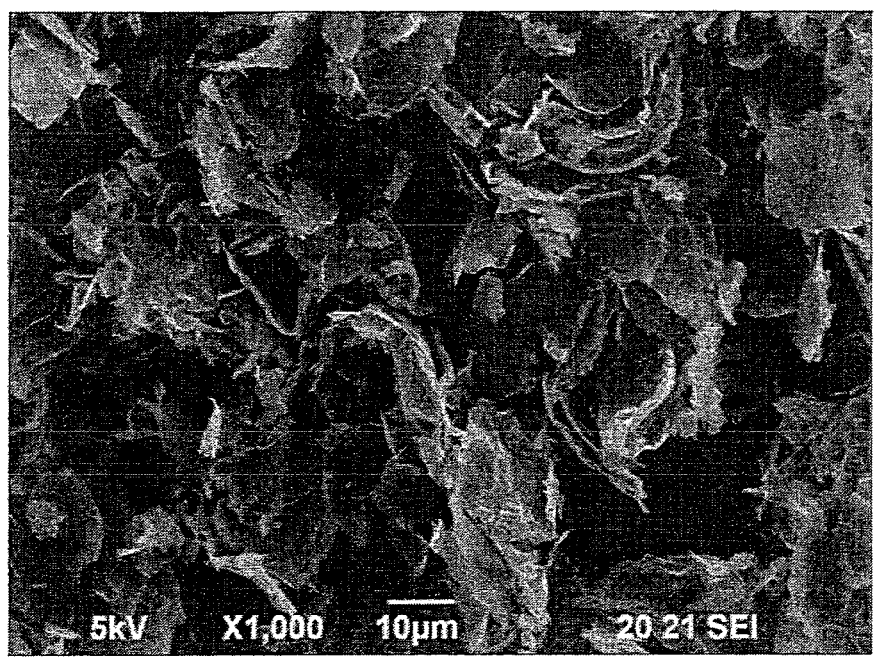

METHOD FOR PRODUCING FLAKE GRAPHITE, AND FLAKE GRAPHITE

TECHNICAL FIELD

The present invention relates to a method for producing exfoliated graphite by exfoliating graphite or primary exfoliated graphite, and exfoliated graphite obtained by the method.

BACKGROUND ART

Graphite is a laminate in which a large number of graphenes are laminated. By exfoliating graphite, graphene or exfoliated graphite having a smaller number of laminated layers of graphene than graphite is obtained. The exfoliated graphite is expected to be applied to electrically conductive materials, thermally conductive materials, and the like.

In recent years, various methods of increasing the dispersibility of the graphene or exfoliated graphite in a resin, and the like by grafting a polymer on exfoliated graphene or exfoliated graphite having a smaller number of laminated layers of graphene than graphite have been studied. For example, the following Patent Literature 1 discloses a method for producing graphene on which a polymer is grafted, by subjecting exfoliated graphene and a radical polymerizable monomer to polymerization in coexistent state.

CITATION LIST

Patent Literature

Patent Literature 1: U.S. Pat. No. 7,659,350 B2

SUMMARY OF INVENTION

Technical Problem

In the method in Patent Literature 1, graphite is previously exfoliated, and the thus obtained exfoliated graphene is used.

However, in conventionally known methods for exfoliating graphene, it is necessary to treat raw material graphite with an acid, then heat the above graphite to exfoliate the graphite, and further collect the obtained powder of graphene or exfoliated graphite. In this manner, in order to obtain graphene or exfoliated graphite, it is necessary to exfoliate raw material graphite through a large number of complicated steps.

In addition, as described above, in conventional methods, graphene or exfoliated graphite is obtained as a powder, and therefore, there is also the problem of difficult handling.

It is an object of the present invention to provide a method for producing relatively easily handleable exfoliated graphite by exfoliating graphite without complicated steps, and exfoliated graphite obtained by the method.

Solution to Problem

A method for producing exfoliated graphite according to the present invention comprises steps of preparing composition which comprises graphite or primary exfoliated graphite and a polymer and in which the polymer is fixed to the graphite or primary exfoliated graphite; and pyrolyzing the polymer contained in the composition to exfoliate the graphite or primary exfoliated graphite and remove the polymer by pyrolysis.

In the present invention, the polymer is pyrolyzed, and the polymer disappears, and exfoliated graphite is obtained.

The present invention encompasses the following different first invention and second invention in a mode in which a polymer is immobilized on graphite or primary exfoliated graphite.

In the first invention, in the step of preparing the composition, the polymer is grafted on the graphite or primary exfoliated graphite in the composition in which the polymer is fixed to the graphite or primary exfoliated graphite.

In the method for producing exfoliated graphite according to the first invention, a polymer in a composition having a structure in which a polymer is grafted on graphite or primary exfoliated graphite is pyrolyzed, and therefore, exfoliated graphite having a large specific surface area can be easily provided. This is considered to be because in the pyrolysis of the polymer, stress during the polymer pyrolysis acts on the grafting point where the polymer is grafted on the graphite or primary exfoliated graphite, and the exfoliation between graphenes is efficiently performed. In addition, in the exfoliated graphite obtained by the production method of the first invention, not only is the interlayer distance between graphenes increased and is the specific surface area increased, but the central portion has a graphite structure and the edge portion has an exfoliated structure, and therefore, the exfoliated graphite is more easily handled than flake alloys obtained by conventional production methods.

In the first embodiment of the method for producing exfoliated graphite according to the first invention, the step of preparing the composition comprises a step of preparing a mixture comprising the graphite or primary exfoliated graphite and a radical polymerizable monomer, and a step of polymerizing the radical polymerizable monomer contained in the mixture to form a polymer in which the radical polymerizable monomer is polymerized in the mixture and graft the polymer on the graphite or primary exfoliated graphite.

In the second embodiment of the method for producing exfoliated graphite according to the first invention, in the step of preparing the composition, the polymer is heated to a temperature in a temperature range of 50° C. or higher and 400° C. or lower in the presence of the graphite or primary exfoliated graphite, and thus, the polymer is grafted on the graphite or primary exfoliated graphite.

In a particular aspect of the method for producing exfoliated graphite according to the first invention, in the step of preparing the composition, the composition further comprises a pyrolyzable foaming agent. In this case, the graphite or primary exfoliated graphite can be exfoliated much more effectively. Therefore, the specific surface area of the obtained exfoliated graphite can be further increased.

In another particular aspect of the method for producing exfoliated graphite according to the first invention, the pyrolyzable foaming agent is at least one heat foaming agent selected from the group consisting of compounds having structures represented by the following formula (1) to formula (4).

[Formula 1]

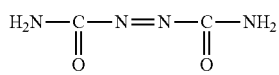

Formula (1)

[Formula 2]

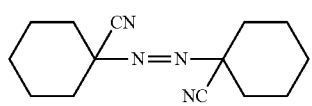

Formula (2)

[Formula 3]

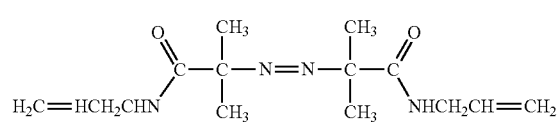

Formula (3)

[Formula 4]

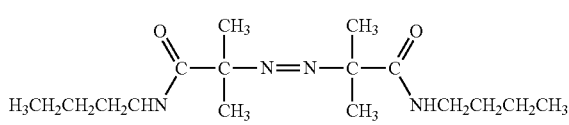

Formula (4)

In another particular aspect of the method for producing exfoliated graphite according to the first invention, in the step of pyrolyzing the polymer to exfoliate the graphite or primary exfoliated graphite, the pyrolyzable foaming agent contained in the composition is pyrolyzed.

In still another particular aspect of the above first embodiment of the method for producing exfoliated graphite according to the first invention, in the step of forming the polymer and grafting the polymer on the graphite or primary exfoliated graphite, the pyrolyzable foaming agent contained in the mixture is pyrolyzed.

In still another particular aspect of the above first embodiment of the method for producing exfoliated graphite according to the first invention, the step of forming the polymer and grafting the polymer on the graphite or primary exfoliated graphite is performed by heating the mixture to polymerize the radical polymerizable monomer contained in the mixture. In this case, both the polymerization of the radical polymerizable monomer and the polymerization of the polymer can be performed by simply heating the mixture. Therefore, the graphite or primary exfoliated graphite can be exfoliated much more easily.

In still another particular aspect of the method for producing exfoliated graphite according to the first invention, the radical polymerizable monomer is a styrene monomer or glycidyl methacrylate. The styrene monomer is inexpensive, and therefore, the production cost of exfoliated graphite can be lowered. In the above-described first embodiment, the styrene monomer can be preferably used as the radical polymerizable monomer. In addition, in the above-described second embodiment, a polymer of glycidyl methacrylate is preferably used as the above polymer.

Exfoliated graphite according to the first invention is exfoliated graphite obtained by the method for producing exfoliated graphite according to this first invention.

In a method for producing exfoliated graphite according to the second invention, in the step of preparing the mixture, the composition in which the polymer is fixed to the graphite or primary exfoliated graphite, comprising graphite or primary exfoliated graphite and a first polymer, the first polymer being adsorbed on the graphite or primary exfoliated graphite, is provided, and in the step of exfoliating the graphite or primary exfoliated graphite, a heating step of heating the composition to a temperature equal to or higher than a pyrolysis temperature of the first polymer to pyrolyze the first polymer to obtain exfoliated graphite is performed.

In the method for producing exfoliated graphite according to the second invention, by preparing a composition which comprises graphite or primary exfoliated graphite and a first polymer which adsorbs on the graphite and in which the first polymer is adsorbed on the graphite or primary exfoliated graphite, the first polymer disappears by pyrolysis, and exfoliated graphite can be obtained. Therefore, exfoliated graphite having a large specific surface area can be easily obtained.

In a particular aspect of the method for producing exfoliated graphite according to the second invention, the first polymer is a polymer having adsorption properties on the graphite and is preferably at least one polymer selected from the group consisting of polyvinyl acetate, polybutyral, and polypropylene glycol.

In another particular aspect of the method for producing exfoliated graphite according to the second invention, in the step of preparing the composition, the composition further comprises a pyrolyzable foaming agent. In this case, the graphite can be exfoliated much more effectively. Therefore, the specific surface area of the obtained exfoliated graphite can be further increased.

In another particular aspect of the method for producing exfoliated graphite according to the second invention, the pyrolyzable foaming agent is at least one heat foaming agent selected from the group consisting of compounds having structures represented by the following formula (1) to formula (4).

[Formula 5]

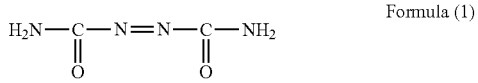

Formula (1)

[Formula 6]

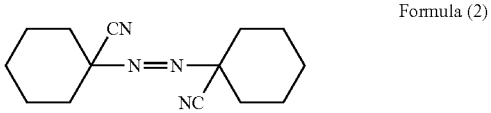

Formula (2)

[Formula 7]

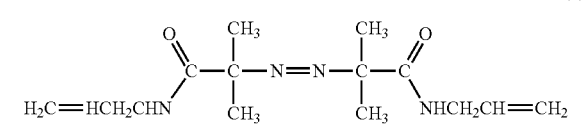

Formula (3)

[Formula 8]

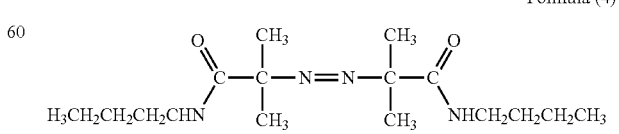

Formula (4)

In another particular aspect of the method for producing exfoliated graphite according to the second invention, in the step of exfoliating the graphite or primary exfoliated graphite, the pyrolyzable foaming agent contained in the composition is pyrolyzed.

In still another particular aspect of the method for producing exfoliated graphite according to the second invention, the exfoliated graphite obtained by the method for producing exfoliated graphite according to the second invention is used as the primary exfoliated graphite, that is, a composition which comprises primary exfoliated graphite and a first polymer and in which the primary exfoliated graphite is adsorbed on the first polymer is provided, and the composition is heated to a temperature equal to or higher than the pyrolysis temperature of the first polymer again. In this case, exfoliated graphite having a much larger specific surface area can be obtained. More preferably, a step of adsorbing the first polymer on the primary exfoliated graphite using the exfoliated graphite obtained in this manner as the primary exfoliated graphite to provide a composition, and a heating step of heating the provided composition to a temperature equal to or higher than the pyrolysis temperature of the first polymer to pyrolyze the first polymer to obtain exfoliated graphite are further repeated. Thus, the specific surface area can be increased much more.

In still another particular aspect of the method for producing exfoliated graphite according to the second invention, the method for producing exfoliated graphite further comprises a step of preparing a mixture comprising the obtained exfoliated graphite and a radical polymerizable monomer after the heating step; a step of polymerizing the radical polymerizable monomer contained in the mixture to form a second polymer in which the radical polymerizable monomer is polymerized in the mixture and graft the second polymer on the exfoliated graphite; and a second heating step of heating the mixture to a temperature at which the second polymer is pyrolyzed or higher to pyrolyze the second polymer to further exfoliate the exfoliated graphite. In this case, exfoliated graphite having a much larger specific surface area can be obtained.

In still another particular aspect of the method for producing exfoliated graphite according to the second invention, the step of preparing the composition comprises a step of preparing a mixture comprising graphite and a radical polymerizable monomer, a step of polymerizing the radical polymerizable monomer contained in the mixture to form a second polymer in which the radical polymerizable monomer is polymerized in the mixture and graft the second polymer on the graphite, a third heating step of heating the mixture to a temperature equal to or higher than a pyrolysis temperature of the second polymer to pyrolyze the second polymer, and a step of mixing primary exfoliated graphite obtained in the third heating step and the first polymer to obtain the composition. In this case, exfoliated graphite having a much larger specific surface area can be obtained.

As the above radical polymerizable monomer, styrene or glycidyl methacrylate can be preferably used.

The exfoliated graphite of the second invention is obtained by the method for producing exfoliated graphite according to the present invention and exfoliated graphite having a large specific surface area and easy handleability can be provided.

Exfoliated graphite according to the present invention is obtained by pyrolyzing a polymer in a composition which comprises graphite or primary exfoliated graphite and the polymer and in which the polymer is fixed to the graphite or primary exfoliated graphite, to remove the polymer.

Advantageous Effects of Invention

In the method for producing exfoliated graphite according to the present invention, a polymer in a composition having a structure in which a polymer is fixed to graphite or primary exfoliated graphite is pyrolyzed, and therefore, exfoliated graphite having a large specific surface area can be easily provided. This is considered to be because in the pyrolysis of the polymer, stress during the polymer pyrolysis acts on the place where the polymer is immobilized on the graphite or primary exfoliated graphite, and the exfoliation between graphenes is efficiently performed. In addition, in the exfoliated graphite obtained by the production method of the present invention, not only is the interlayer distance between graphenes increased and is the specific surface area increased, but the central portion has a graphite structure and the edge portion has an exfoliated structure, and therefore, the exfoliated graphite is more easily handled than flake alloys obtained by conventional production methods.

BRIEF DESCRIPTION OF DRAWINGS

FIG. 1 is a diagram showing the TG/DTA measurement results of azodicarbonamide (ADCA) used in Example 1.

FIG. 2 is a diagram showing the TG/DTA measurement results of expanded graphite as a raw material used in Examples 1 to 5.

FIG. 3 is a diagram showing the TG/DTA measurement results of exfoliated graphite obtained in Example 1.

FIG. 4 is a diagram showing the TG/DTA measurement results of exfoliated graphite obtained in Example 2.

FIG. 5 is a diagram showing the TG/DTA measurement results of exfoliated graphite obtained in Example 3.

FIG. 6 is a diagram showing the TG/DTA measurement results of exfoliated graphite obtained in Example 4.

FIG. 7 is a diagram showing the TG/DTA measurement results of exfoliated graphite obtained in Example 5.

FIG. 9 is a diagram showing the XRD spectrum of exfoliated graphite obtained in Example 4.

FIG. 10 is a photograph of the exfoliated graphite used in Examples 1 to 5 taken by a scanning electron microscope (SEM).

FIG. 11 is a photograph of the exfoliated graphite obtained by Example 1 taken by the scanning electron microscope (SEM).

FIG. 12 is a photograph of the exfoliated graphite obtained by Example 2 taken by the scanning electron microscope (SEM).

FIG. 13 is a photograph of the exfoliated graphite obtained by Example 3 taken by the scanning electron microscope (SEM).

FIG. 14 is a photograph of the exfoliated graphite obtained by Example 4 taken by the scanning electron microscope (SEM).

FIG. 15 is a photograph of the exfoliated graphite obtained by Example 5 taken by the scanning electron microscope (SEM).

DESCRIPTION OF EMBODIMENTS

Figure 8:
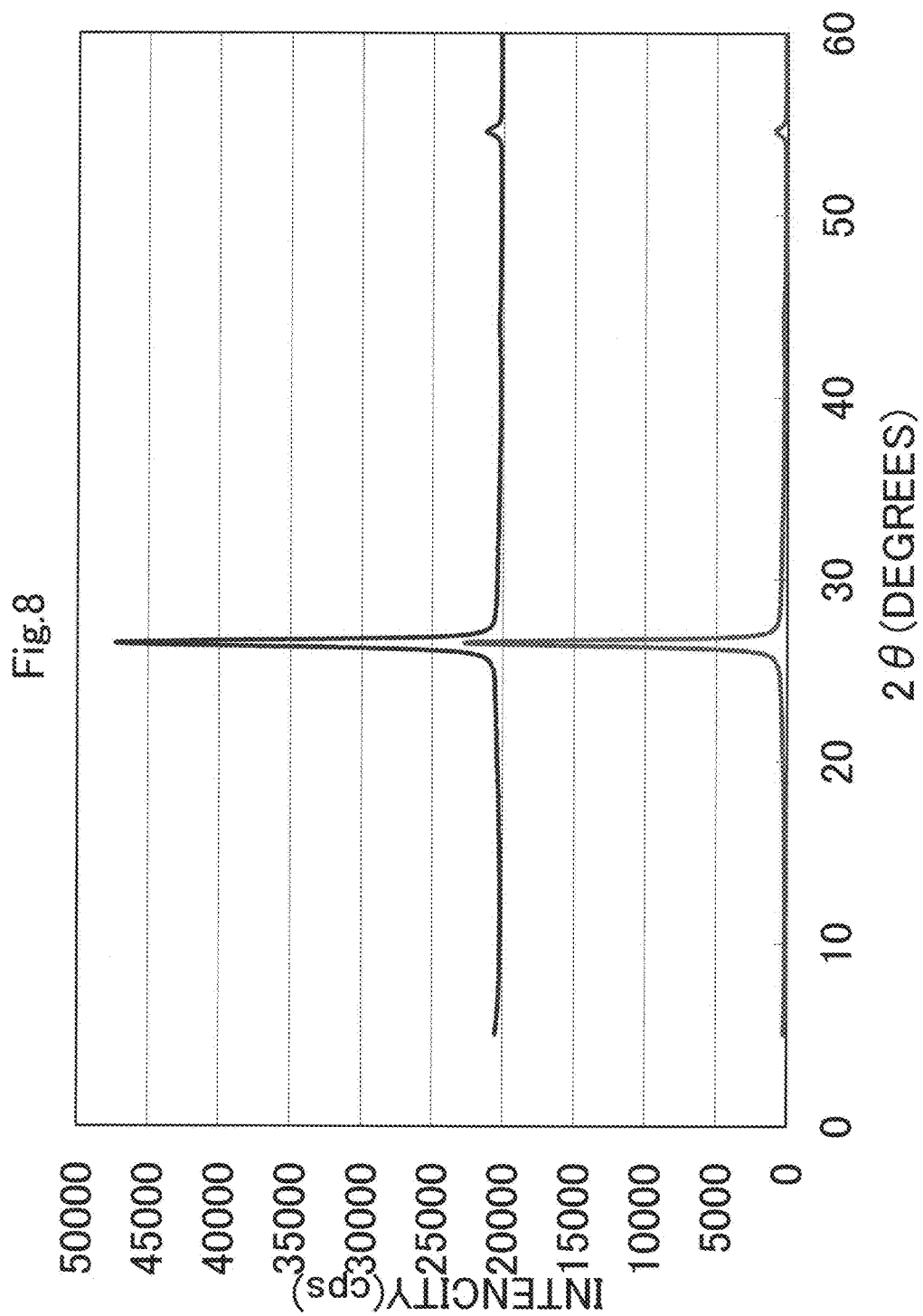
FIG. 8 is a diagram showing the XRD spectrum of exfoliated graphite obtained in Example 2.

The present invention will be clarified below by describing specific embodiments of the present invention.

A method for producing exfoliated graphite according to the present invention comprises the steps of preparing a composition which comprises graphite or primary exfoliated graphite and a polymer and in which the polymer is fixed to the above graphite or primary exfoliated graphite; and pyrolyzing the polymer contained in the composition to exfoliate the graphite or primary exfoliated graphite. The polymer is pyrolyzed and finally removed. Therefore, the polymer is not contained in the obtained exfoliated graphite.

First, a first invention will be described in detail, and then, a second invention will be described in detail below.

[First Invention]

(Step of Preparing Raw Material Composition)

In a method for producing exfoliated graphite according to the first invention, a composition comprising graphite or primary exfoliated graphite and a polymer in which a radical polymerizable monomer is polymerized, the polymer being grafted on the graphite or primary exfoliated graphite, is prepared first. As the step of preparing this composition, the following first method and second method can be used.

The above graphite is a laminate of a plurality of graphene layers, and, for example, natural graphite, synthetic graphite, and expanded graphite can be used. Preferably, expanded graphite can be used as the above graphite. The distance between graphene layers is larger in expanded graphite than in usual graphite, and therefore, the expanded graphite can be easily exfoliated. Therefore, by using expanded graphite as the above graphite, exfoliated graphite can be easily produced.

In the above graphite, the number of laminated layers of graphene is about 100000 or more to 1000000, and the above graphite has a value of 20 $m^2/g$ or less in terms of BET specific surface area. In addition, the exfoliated graphite obtained by the first invention refers to one in which the number of laminated layers of graphene is 100 or less, and the BET specific surface area is 40 $m^2/g$ or more and 2500 $m^2/g$ or less.

In addition, in the first invention, as a raw material, primary exfoliated graphite may be used instead of graphite. The primary exfoliated graphite widely includes, in addition to exfoliated graphite obtained by exfoliating graphite by the production method of the first invention, exfoliated graphite obtained by exfoliating graphite by various methods described later. When the primary exfoliated graphite is used as a raw material, similarly, a composition which comprises primary exfoliated graphite and a first polymer and in which the first polymer is adsorbed on the primary exfoliated graphite is provided. The primary exfoliated graphite is obtained by exfoliating graphite, and therefore, its specific surface area can be larger than that of graphite.

(First Method)

In the first method, first, a mixture comprising graphite or primary exfoliated graphite and a radical polymerizable monomer is prepared. Then, the radical polymerizable monomer contained in the mixture is polymerized to form a polymer in which the above radical polymerizable monomer is polymerized in the mixture and graft the polymer on the graphite or primary exfoliated graphite.

In the first method, first, a composition comprising graphite or primary exfoliated graphite and a radical polymerizable monomer is prepared.

The above radical polymerizable monomer is not particularly limited as long as it is a monomer having a functional group generally known as radical polymerizable. A monomer having an appropriate radical polymerizable functional group can be used. Examples of the above radical polymerizable monomer include styrene, methyl α-ethylacrylate, methyl α-benzylacrylate, methyl α-[2,2-bis(carbomethoxy)ethyl]acrylate, dibutyl itaconate, dimethyl itaconate, dicyclohexyl itaconate, α-substituted acrylates comprising α-methylene-δ-valerolactone, α-methylstyrene, or α-acetoxystyrene, vinyl monomers having a glycidyl group or a hydroxyl group, such as glycidyl methacrylate, 3,4-epoxycyclohexylmethyl methacrylate, hydroxyethyl methacrylate, hydroxyethyl acrylate, hydroxypropyl acrylate, and 4-hydroxybutyl methacrylate; vinyl monomers having an amino group, such as allylamine, diethylaminoethyl(meth)acrylate, and dimethylaminoethyl(meth)acrylate; monomers having a carboxyl group, such as methacrylic acid, maleic anhydride, maleic acid, itaconic acid, acrylic acid, crotonic acid, 2-acryloyloxyethyl succinate, 2-methacryloyloxyethyl succinate, and 2-methacryloyloxyethylphthalic acid; monomers having a phosphate group, such as Phosmer M, Phosmer CL, Phosmer PE, Phosmer MH, and Phosmer PP manufactured by Uni-Chemical Co., Ltd.; monomers having an alkoxysilyl group, such as vinyltrimethoxysilane and 3-methacryloxypropyltrimethoxysilane; and (meth)acrylate-based monomers having an alkyl group, a benzyl group, or the like. The above radical polymerizable monomer may be used alone, or a plurality of types of monomers may be used in combination. Preferably, as the above radical polymerizable monomer, an inexpensive styrene monomer can be used.

The blending ratio between the above graphite and the above radical polymerizable monomer is not particularly limited and is desirably a ratio in the range of 1:1 to 1:100 in terms of a weight ratio. By setting the above blending ratio in the above range, it is possible to exfoliate the above graphite or primary exfoliated graphite effectively to obtain exfoliated graphite much more effectively.

In the step of preparing the above composition, preferably, a composition further comprising a pyrolyzable foaming agent that generates a gas in pyrolysis is provided. In this case, the graphite or primary exfoliated graphite can be exfoliated much more effectively by heating described later.

The above pyrolyzable foaming agent is not particularly limited as long as it is a compound that decomposes spontaneously by heating and generates a gas during the decomposition. As the above pyrolyzable foaming agent, for example, azocarboxylic acid-based, diazoacetamide-based, azonitrile compound-based, benzenesulfohydrazine-based, or nitroso compound-based foaming agents or the like that generate a nitrogen gas during decomposition, or foaming agents that generate carbon monoxide, carbon dioxide, methane, aldehyde, or the like during decomposition can be used. The above pyrolyzable foaming agent may be used alone, or a plurality of types of foaming agents may be used in combination.

Preferably, as the above pyrolyzable foaming agent, azodicarbonamide (ADCA) having a structure represented by the following formula (1) and foaming agents having structures represented by the following formulas (2) to (4) can be used. These foaming agents decompose spontaneously by heating and generate a nitrogen gas during the decomposition.

[Formula 9]

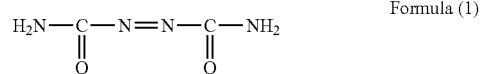

Formula (1)

[Formula 10]

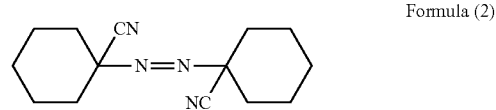

Formula (2)

-continued

[Formula 11]

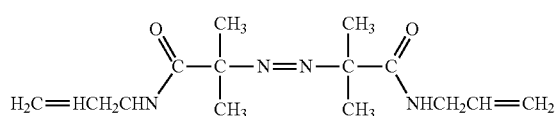

Formula (3)

[Formula 12]

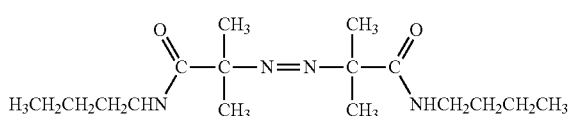

Formula (4)

The pyrolysis temperature of the above pyrolyzable foaming agent is not particularly limited and may be lower or higher than a temperature at which the above radical polymerizable monomer spontaneously initiates polymerization. For example, the pyrolysis temperature of the ADCA having the structure represented by the above formula (1) is 210° C., which is a temperature higher than a temperature at which styrene spontaneously initiates polymerization, 150° C., when the above radical polymerizable monomer is styrene. The pyrolysis initiation temperatures of the foaming agents having the structures represented by the above formulas (2) to (4) are 88° C., 96° C., and 110° C. in order, and these are temperatures lower than the temperature at which styrene spontaneously initiates polymerization, 150° C.

The blending ratio between the above graphite or primary exfoliated graphite and the above pyrolyzable foaming agent is not particularly limited, and 100 parts by weight to 300 parts by weight of the above pyrolyzable foaming agent is preferably blended based on 100 parts by weight of the above graphite or primary exfoliated graphite. By setting the amount of the above pyrolyzable foaming agent blended in the above range, it is possible to exfoliate the above graphite or primary exfoliated graphite much more effectively to obtain exfoliated graphite effectively.

The method for preparing the above composition is not particularly limited. Examples of the method include a method of dispersing the above graphite or primary exfoliated graphite in the above radical polymerizable monomer using the above radical polymerizable monomer as a dispersion medium. In addition, the above composition further comprising the above pyrolyzable foaming agent can be provided by dissolving or dispersing the above pyrolyzable foaming agent in the above radical polymerizable monomer.

Then, the step of polymerizing the above radical polymerizable monomer contained in the above composition to form a polymer in which the above radical polymerizable monomer is polymerized in the above composition is performed.

On this occasion, the above radical polymerizable monomer forms a free radical, and thus, the above radical polymerizable monomer undergoes radical polymerization, and thus, the polymer in which the above radical polymerizable monomer is polymerized is formed. On the other hand, the graphite contained in the above composition is a laminate of a plurality of graphene layers and therefore has radical trapping properties. Therefore, when the above radical polymerizable monomer is subjected to polymerization in the above composition comprising the above graphite or primary exfoliated graphite, the above free radical is adsorbed on the ends and surfaces of the graphene layers of the above graphite or primary exfoliated graphite. Therefore, the above polymer or the above radical polymerizable monomer having the above free radical formed during the polymerization is grafted on the ends and surfaces of the graphene layers of the above graphite or primary exfoliated graphite.

Examples of the method for polymerizing the above radical polymerizable monomer contained in the above composition include a method of heating the above composition to the temperature at which the above radical polymerizable monomer spontaneously initiates polymerization or higher. By heating the above composition to the above temperature or higher, a free radical can be formed in the above radical polymerizable monomer contained in the above composition. Thus, the above-described polymerization and grafting can be performed.

When the above radical polymerizable monomer is polymerized by heating as described above, both the polymerization of the above radical polymerizable monomer and the pyrolysis of the above polymer described later can be performed by simply heating the above composition. Therefore, the exfoliation of the graphite or primary exfoliated graphite is much easier.

The above heating method is not particularly limited as long as it is a method that can heat the above composition to the above temperature or higher. The above composition can be heated by an appropriate method and apparatus. In addition, in the above heating, heating may be performed without sealing, that is, under atmospheric pressure.

In addition, in order to reliably polymerize the above radical polymerizable monomer, after the above composition is heated to a temperature equal to or higher than the temperature at which the above radical polymerizable monomer spontaneously initiates polymerization, the above temperature may be further maintained for a certain time. The time that the above composition is maintained around the above temperature is preferably in the range of 0.5 to 5 hours though depending on the type and amount of the radical polymerizable monomer used.

After the step of forming the above polymer, the step of heating the above composition to the pyrolysis temperature of the above polymer to pyrolyze the above polymer is performed. Thus, the above polymer contained in the above composition, the above polymer grafted on the ends and surfaces of the graphene layers of the above graphite or primary exfoliated graphite, and the like are pyrolyzed. Preferably, the above composition is heated until the polymer is pyrolyzed and removed by heating. In the first invention, the pyrolysis temperature of the above polymer refers to TGA measurement-dependent decomposition end point temperature. For example, when the polymer is polystyrene, the pyrolysis temperature of the above polymer is about 350° C.

At this time, when the above polymer grafted on the ends and surfaces of the graphene layers of the above graphite or primary exfoliated graphite, and the like are pyrolyzed, peel force occurs between the above graphene layers. Therefore, by pyrolyzing the above polymer and the like, the above graphite or primary exfoliated graphite can be exfoliated between the graphene layers of the above graphite or primary exfoliated graphite to obtain exfoliated graphite.

In the first invention, the exfoliated graphite is a graphene laminate after exfoliation obtained by subjecting the original graphite or primary exfoliated graphite to exfoliation treatment, and refers to a graphene laminate having a larger specific surface area than the above original graphite or primary exfoliated graphite, or a graphene laminate in which the decomposition end point of the original graphite or primary exfoliated graphite shifts to lower temperature.

The above heating method is not particularly limited as long as it is a method that can heat the above composition to the pyrolysis temperature of the above polymer. The above composition can be heated by an appropriate method and apparatus. In addition, in the above heating, heating may be performed without sealing, that is, under atmospheric pressure. Therefore, exfoliated graphite can be produced inexpensively and easily.

In order to reliably pyrolyze the above polymer, and burn off and remove the polymer, after the above composition is heated to a temperature equal to or higher than the pyrolysis temperature of the above polymer, the above temperature may be further maintained for a certain time. The time that the above composition is maintained around the above temperature is preferably in the range of 0.5 to 5 hours though depending on the type and amount of the radical polymerizable monomer used.

In addition, when the above radical polymerizable monomer is polymerized by heating in the step of forming the above polymer, heat treatment in the step of forming the above polymer, and heat treatment in the step of pyrolyzing the above polymer described later may be continuously performed by the same method and apparatus.

In the above heating, in a case where the above composition further comprises a pyrolyzable foaming agent, when the above composition is heated to the pyrolysis temperature of the above pyrolyzable foaming agent, the above pyrolyzable foaming agent is pyrolyzed in the above composition. On the other hand, the above pyrolyzable foaming agent generates a gas and foams during pyrolysis. At this time, when the above pyrolyzable foaming agent is pyrolyzed between the graphene layers of the above graphite or primary exfoliated graphite, the above gas generated by the above pyrolysis enters between the above graphene layers, and the space between the above graphene layers is increased. Thus, peel force occurs between the above graphene layers, and therefore, the above graphite or primary exfoliated graphite can be further exfoliated. Therefore, by using the above pyrolyzable foaming agent, the specific surface area of the obtained exfoliated graphite can be increased much more.

In the first invention, by using the above radical polymerizable monomer and/or the above polymer and the above pyrolyzable foaming agent in combination, the graphite or primary exfoliated graphite can be exfoliated much more effectively. The reason why the graphite or primary exfoliated graphite can be exfoliated much more effectively by such a method is not certain, but the following reason is considered. As described above, when the above radical polymerizable monomer forms a free radical, the above polymer or the above radical polymerizable monomer having the above free radical formed during the polymerization is grafted on the ends and surfaces of the graphene layers of the above graphite or primary exfoliated graphite. Therefore, the above free radical is trapped in the graphene layers of the above graphite or primary exfoliated graphite. On the other hand, the above pyrolyzable foaming agent has the property of high affinity for radicals and therefore is attracted to the free radical trapped in the graphene layers of the above graphite or primary exfoliated graphite in the above composition. Therefore, the above pyrolyzable foaming agent is easily pyrolyzed around the lamination surfaces of the graphene sheets of the graphite or primary exfoliated graphite. Therefore, peel force can be effectively applied between the graphene layers of the above graphite or primary exfoliated graphite by the pyrolysis of the above pyrolyzable foaming agent.

The pyrolysis of the above pyrolyzable foaming agent need not necessarily be performed in the step of pyrolyzing the above polymer. For example, when the pyrolysis temperature of the above pyrolyzable foaming agent is lower than the temperature at which the above radical polymerizable monomer spontaneously initiates polymerization, the above pyrolyzable foaming agent may be pyrolyzed when the above radical polymerizable monomer is polymerized by heating in the step of forming the above polymer. In addition, the pyrolysis of the above pyrolyzable foaming agent may be before the polymerization of the radical polymerizable monomer, after the polymerization, or simultaneous with the polymerization.

In addition, in order to reliably pyrolyze the above pyrolyzable foaming agent, after the above composition is heated to a temperature equal to or higher than the pyrolysis temperature of the above pyrolyzable foaming agent, the above temperature may be further maintained for a certain time. The time that the above composition is maintained around the above temperature is preferably in the range of 0.5 to 5 hours though depending on the type and amount of the pyrolyzable foaming agent used.

(Second Method)

In the second method, in the step of preparing a composition comprising graphite or primary exfoliated graphite and a polymer in which a radical polymerizable monomer is polymerized, the polymer being grafted on the graphite or primary exfoliated graphite, the polymer is heated to a temperature in the temperature range of 300° C. or higher and 500° C. or lower in the presence of the graphite to graft the polymer on the graphite. In other words, in the first method, a radical polymerizable monomer is polymerized in the presence of graphite or primary exfoliated graphite to form a polymer and promote the grafting of the polymer on the graphite or primary exfoliated graphite, whereas in the second method, by heating a previously obtained polymer to the above particular temperature range in the presence of graphite or primary exfoliated graphite, a polymer radical formed by pyrolyzing the polymer can be directly grafted on the graphite or primary exfoliated graphite.

As the polymer that can be used in the second method, an appropriate pyrolytically radical-forming polymer can be used.

Most organic polymers generate radicals at decomposition temperature. Therefore, as polymers that form radicals around the above decomposition temperature, many organic polymers can be used. However, preferably, polymers of vinyl group-containing monomers are preferably used. Examples of such vinyl group-containing monomers include monomers such as ethyl acrylate, butyl acrylate, 2-ethylhexyl acrylate, and benzyl acrylate. In addition, examples of polymers obtained by polymerizing the above vinyl group-containing monomers can include alkyl(meth)acrylate esters, polypropylene, polyvinyl phenol, polyphenylene sulfide, and polyphenylene ether.

In addition, polymers containing halogen elements, such as chlorine, such as polyvinyl chloride, chlorinated vinyl chloride resins, ethylene fluoride resins, vinylidene fluoride resins, and vinylidene chloride resins, and the like can also be used. Ethylene vinyl acetate copolymers (EVA), polyvinyl acetal, polyvinylpyrrolidone, and copolymers thereof can also be used. Polymers obtained by cationic polymerization, such as polyisobutylene and polyalkylene ethers, can also be used.

Polyurethanes, epoxy resins, modified silicone resins, silicone resins, and the like obtained by crosslinking oligomers can also be used.

Polyallylamine may be used, and in this case, an amino group can be grafted on the graphite or primary exfoliated graphite. Polyvinyl phenol and polyphenols may be used, and in this case, phenolic OH can be grafted on the graphite or primary exfoliated graphite. In addition, when a polymer having a phosphate group is used, the phosphate group can be grafted.

In addition, condensation polymers, such as polyesters and polyamides, may be used. In this case, the concentration of radicals obtained at decomposition temperature is low, but decomposition products are grafted.

As the above previously provided polymer, homopolymers of glycidyl methacrylate, polystyrene, polyvinyl acetate, polypropylene glycol, polybutyral, and the like are preferably used. By using these polymers, the graphite or primary exfoliated graphite can be exfoliated much more effectively.

In the second method, the blending ratio between the above graphite or primary exfoliated graphite and the above polymer is not particularly limited and is desirably a ratio in the range of 1:5 to 1:20 in terms of a weight ratio. By setting the blending ratio in this range, it is possible to exfoliate the graphite or primary exfoliated graphite more effectively to obtain exfoliated graphite effectively.

Also in the second method, as in the case of the first method, in the step of preparing the composition, preferably, it is desired to further contain a pyrolyzable foaming agent in the composition. As in the case of the first method, the graphite or primary exfoliated graphite can be exfoliated much more effectively by heating that causes the pyrolysis of the polymer described later.

The pyrolyzable foaming agents that can be used are similar to those in the case of the first method. Therefore, preferably, it is desired to use the foaming agents having the structures represented by formula (1) to (4) described above.

Also in the second method, the blending ratio between the graphite or primary exfoliated graphite and the pyrolyzable foaming agent is not particularly limited, and the pyrolyzable foaming agent is preferably blended in the ratio of 100 to 300 parts by weight based on 100 parts by weight of the graphite or primary exfoliated graphite. When the blending ratio is in this range, the graphite or primary exfoliated graphite can be exfoliated much more effectively.

Also in the second method, the specific method for preparing the composition is not limited. Examples of the specific method include a method of introducing the above polymer and graphite or primary exfoliated graphite into an appropriate solvent or dispersion medium and heating them.

The polymer is grafted on the graphite or primary exfoliated graphite by the above heating. This heating temperature is desirably in the range of 50° C. to 400° C. By setting the heating temperature in this temperature range, the polymer can be effectively grafted on the graphite. Thus, the graphite or primary exfoliated graphite can be exfoliated much more effectively. The reason for this is considered as follows.

By heating the polymer obtained by polymerizing the above radical polymerizable monomer, part of the polymer decomposes and is radical-trapped in the graphene layers of the graphite or primary exfoliated graphite. Therefore, the polymer is grafted on the graphite or primary exfoliated graphite. Then, when the polymer is decomposed and fired in a heating step described later, large stress is applied to the grafting surface where the polymer is grafted on the graphite or primary exfoliated graphite. Therefore, it is considered that peel force acts starting from the grafting point, and the distance between the graphene layers is effectively increased.

(Step of Exfoliating Graphite by Pyrolysis of Polymer)

In both the above first method and second method, after the composition is provided as described above, the polymer contained in the composition is pyrolyzed. Thus, the graphite or primary exfoliated graphite is exfoliated, and exfoliated graphite can be obtained. In order to perform the pyrolysis of the polymer in this case, the above composition can be heated to the pyrolysis temperature of the polymer or higher. More specifically, the above composition is heated to the pyrolysis temperature of the polymer or higher. Particularly, the above composition is further heated to the pyrolysis temperature or higher to burn off and remove the polymer. Thus, exfoliated graphite containing no polymer can be obtained. For example, the pyrolysis temperature of polystyrene is about 280° C. to 400° C., the pyrolysis temperature of polyglycidyl methacrylate is about 250° C. to 350° C., and the pyrolysis temperature of polybutyral is about 250° C. to 560° C. in the air.

It is considered that exfoliated graphite can be obtained by the pyrolysis of the above polymer for the above-described reason, that is, because when the polymer grafted on the graphite is fired, large stress acts on the grafting point, and thus, the distance between the graphenes increases.

In the first method, it has been described that the heating for polymerizing the radical polymerizable monomer and the pyrolysis of the above polymer may be continuously carried out in the same heating step. Also in the second method, the heating step for grafting the above polymer on the graphite or primary exfoliated graphite and the heating step of pyrolyzing the above polymer may be continuously carried out.

Further, it is desired to carry out both the first method and the second method a plurality of times. For example, by preparing a composition by the first method, then pyrolyzing the polymer to obtain exfoliated graphite, and then further repeating the first method one or more times using the obtained exfoliated graphite as primary exfoliated graphite that is a raw material in the first method, exfoliated graphite having a much larger specific surface area can be obtained. Similarly, it is possible to provide a composition by the second method, then pyrolyze the polymer to obtain exfoliated graphite, and then further carry out the second method and the pyrolysis of the polymer using the obtained exfoliated graphite as primary exfoliated graphite that is a raw material in the second method, to obtain exfoliated graphite. Also in this case, exfoliated graphite having a much larger specific surface area can be obtained.

Further, it is possible to heat a composition provided by the first method to obtain exfoliated graphite, and then, using the obtained exfoliated graphite as primary exfoliated graphite as a raw material in the second method, subsequently obtain exfoliated graphite as in the second method. On the contrary, it is possible to heat a composition obtained by the second method to obtain exfoliated graphite, and then subsequently provide a composition and further pyrolyze the polymer by heating as in the first method using the exfoliated graphite as primary exfoliated graphite that is a raw material in the first method, to obtain exfoliated graphite. By repeating exfoliating by the production method of the first invention one or more times further using exfoliated graphite obtained by the production method of the first invention as primary exfoliated graphite as a raw material in this manner, exfoliated graphite having a much larger specific surface area can be obtained.

(Other Modifications)

In the first invention, exfoliated graphite is obtained by pyrolyzing a polymer in a composition having a structure in which a polymer in which a radical polymerizable monomer is polymerized is grafted on graphite or primary exfoliated graphite, as described above. In the first invention, further, the step of exfoliating graphite by another method may be performed. For example, a method for exfoliating graphite other than the exfoliated graphite of the first invention may be further carried out using as a raw material exfoliated graphite obtained by the method for producing exfoliated graphite according to the first invention. Alternatively, the method for producing exfoliated graphite according to the first invention may be carried out using as a raw material primary exfoliated graphite obtained by another method for exfoliating graphite. Also in these cases, exfoliated graphite having a much larger specific surface area can be obtained. As such another method for exfoliating graphite, for example, a method for exfoliating graphite by electrochemical treatment, or an adsorption-pyrolysis method can be used. The adsorption-pyrolysis method is a method of adsorbing on graphite or primary exfoliated graphite a polymer having the property of being adsorbed on the graphite of graphite like polyvinyl acetate, and, after that, pyrolyzing the above polymer by heating. In this case, stress in the pyrolysis is applied to the adsorption point of the polymer on the graphene, and therefore, the distance between the graphene layers of the graphite can be increased as in the case of the production method of the first invention.

(Exfoliated Graphite)

The exfoliated graphite of the first invention is obtained by pyrolyzing a polymer in a composition which comprises graphite or primary exfoliated graphite and the polymer and in which the polymer is fixed to the graphite or primary exfoliated graphite, to remove the polymer. The polymer used for exfoliation is not substantially contained in the exfoliated graphite of the first invention. The exfoliated graphite obtained by the production method of the first invention is characterized by being relatively less likely to scatter than exfoliated graphite obtained by a conventionally known production method.

By grinding the above exfoliated graphite obtained by the production method of the first invention, exfoliated graphite having characteristics similar to those of exfoliated graphite obtained by a conventional production method can also be obtained.

In the method for producing exfoliated graphite according to the first invention, exfoliated graphite having a specific surface area of 40 $m^2/g$ or more can be obtained. Further, exfoliated graphite having a specific surface area of 100 $m^2/g$ or more can be obtained. Furthermore, exfoliated graphite having a specific surface area of 180 $m^2/g$ or more can be obtained.

The specific surface area of the exfoliated graphite obtained by the first invention is large, and therefore, the exfoliated graphite of the first invention is excellent in physical properties, such as elastic modulus, and electrical properties, such as electrical conductivity. Therefore, for example, by dispersing the exfoliated graphite of the first invention in a resin, a resin composite material excellent in rigidity and combustion resistance can be obtained.

In addition, it is also possible to further exfoliate the exfoliated graphite obtained by the first invention by a conventionally known exfoliation method to provide exfoliated graphite having a much larger specific surface area. The exfoliated graphite obtained by the first invention is thinner and has a larger specific surface area than usual graphite, and therefore, by using the above exfoliated graphite in a conventional exfoliation method, the above exfoliated graphite can be exfoliated more efficiently.

[Second Invention]

Next, the details of the second invention will be described.

(Graphite or Primary Exfoliated Graphite)

In the production method of the second invention, a composition which comprises graphite or primary exfoliated graphite and a first polymer and in which the first polymer is adsorbed on the graphite or primary exfoliated graphite is provided as a raw material.

The above graphite is a laminate of a plurality of graphene layers, and, for example, natural graphite, synthetic graphite, and expanded graphite can be used. Preferably, expanded graphite can be used as the above graphite. The distance between graphene layers is larger in expanded graphite than in usual graphite, and therefore, the expanded graphite can be easily exfoliated. Therefore, by using expanded graphite as the above graphite, exfoliated graphite can be easily produced.

In the above graphite, the number of laminated layers of graphene is about 100000 or more to 1000000, and the above graphite has a value of 20 $m^2/g$ or less in terms of BET specific surface area. In addition, the exfoliated graphite obtained by the second invention refers to one in which the number of laminated layers of graphene is 100 or less, and the BET specific surface area is 40 $m^2/g$ or more and 2000 $m^2/g$ or less.

In addition, in the second invention, as a raw material, primary exfoliated graphite may be used instead of graphite. The primary exfoliated graphite widely includes, in addition to exfoliated graphite obtained by exfoliating graphite by the production method of the second invention, exfoliated graphite obtained by exfoliating graphite by various methods described later. When the primary exfoliated graphite is used as a raw material, similarly, a composition which comprises primary exfoliated graphite and a first polymer and in which the first polymer is adsorbed on the primary exfoliated graphite is provided. The primary exfoliated graphite is obtained by exfoliating graphite, and therefore, its specific surface area may be larger than that of graphite.

(First Polymer)

As the above first polymer, various polymers that are adsorbed on graphite by ultrasonic treatment in a solvent suitable for the dispersion of the first polymer and the graphite can be used. Examples of such polymers can include pyrolyzable polymers, such as polyvinyl acetate, polybutyral, and polypropylene glycol.

The blending ratio between the above graphite and the first polymer is not particularly limited and is desirably a ratio in the range of 1:1 to 1:100 in terms of a weight ratio. By setting the blending ratio in this range, the exfoliation of the graphite can be promoted more effectively.

(Pyrolyzable Foaming Agent)

In the step of preparing the above composition, preferably, a composition further comprising a pyrolyzable foaming agent that generates a gas in pyrolysis is provided. In a case where the above composition further comprises a pyrolyzable foaming agent, when the above composition is heated to the pyrolysis temperature of the above pyrolyzable foaming agent, the above pyrolyzable foaming agent is pyrolyzed in the above composition. On the other hand, the above pyrolyzable foaming agent generates a gas and foams during pyrolysis. At this time, when the above pyrolyzable foaming agent is pyrolyzed between the graphene layers of the above graphite or primary exfoliated graphite, the above gas generated by the above pyrolysis enters between the above graphene layers, and the space between the above graphene layers is increased. Thus, peel force occurs between the above graphene layers, and therefore, the above graphite or primary exfoliated graphite can be further exfoliated. Therefore, by using the above pyrolyzable foaming agent, the specific surface area of the obtained exfoliated graphite can be increased much more.

The above pyrolyzable foaming agent is not particularly limited as long as it is a compound that decomposes spontaneously by heating and generates a gas during the decomposition. As the above pyrolyzable foaming agent, for example, azocarboxylic acid-based, diazoacetamide-based, azonitrile compound-based, benzenesulfohydrazine-based, or nitroso compound-based foaming agents or the like that generate a nitrogen gas during decomposition, or foaming agents that generate carbon monoxide, carbon dioxide, methane, aldehyde, or the like during decomposition can be used. The above pyrolyzable foaming agent may be used alone, or a plurality of types of foaming agents may be used in combination.

Preferably, as the above pyrolyzable foaming agent, the azodicarbonamide (ADCA) having the structure represented by formula (1) and the foaming agents having the structures represented by formulas (2) to (4) in the first invention described above can be used. These foaming agents decompose spontaneously by heating and generate a nitrogen gas during the decomposition.

The pyrolysis temperature of the above pyrolyzable foaming agent is not particularly limited and may be lower or higher than a temperature at which a radical polymerizable monomer that is an optional component described later spontaneously initiates polymerization. For example, the pyrolysis temperature of the ADCA having the structure represented by the above formula (1) is 210° C., which is a temperature higher than a temperature at which styrene spontaneously initiates polymerization, 150° C., when the above radical polymerizable monomer is styrene.

The TG/DTA measurement results of ADCA are shown in FIG. 1.

The pyrolysis initiation temperatures of the foaming agents having the structures represented by the above formulas (2) to (4) are 88° C., 96° C., and 110° C. in order, and these are temperatures lower than the temperature at which styrene spontaneously initiates polymerization, 150° C.

The blending ratio between the above graphite or primary exfoliated graphite and the above pyrolyzable foaming agent is not particularly limited, and 100 parts by weight to 300 parts by weight of the above pyrolyzable foaming agent is preferably blended based on 100 parts by weight of the above graphite or primary exfoliated graphite. By setting the amount of the above pyrolyzable foaming agent blended in the above range, it is possible to exfoliate the above graphite or primary exfoliated graphite effectively to obtain exfoliated graphite effectively.

(Method for Preparing Composition)

The method for preparing the above composition is not particularly limited. Examples of the method can include a method of dissolving or dispersing the above graphite and the first polymer in an appropriate solvent. As such a solvent, tetrahydrofuran, methyl ethyl ketone, toluene, ethyl acetate, and the like can be used.

In addition, when the pyrolyzable foaming agent is used, the pyrolyzable foaming agent can also be further added and dispersed or dissolved in the above solvent.

In addition, in the production method of the second invention, as the above composition, a composition in which a first polymer is adsorbed on graphite or primary exfoliated graphite is provided in a solvent. The method for adsorbing the first polymer on the graphite or primary exfoliated graphite is not particularly limited. As described above, the first polymer has adsorption properties on graphite, and therefore, a method of mixing the graphite or primary exfoliated graphite with the first polymer in the above-described solvent can be used. Preferably, in order to more effectively adsorb the first polymer on the graphite or primary exfoliated graphite, ultrasonic treatment is desirably carried out. The ultrasonic treatment method is not particularly limited. For example, a method of irradiation with ultrasonic waves at about 100 W and an oscillation frequency of about 28 kHz using an appropriate ultrasonic treatment apparatus can be used.

In addition, the ultrasonic treatment time is also not particularly limited and may be equal to or more than the time required for the first polymer to be adsorbed on the graphite. For example, in order to adsorb polyvinyl acetate on the graphite, ultrasonic treatment can be preferably maintained for about 30 minutes or 60 minutes, more preferably about 120 minutes.

It is considered that the adsorption of the first polymer is due to the interaction between the surface energy of the graphite and the first polymer.

(Heating Step)

In the production method of the second invention, after the step of preparing the above composition, the above composition is heated to a temperature equal to or higher than the pyrolysis of the first polymer. Thus, surprisingly, exfoliated graphite having a specific surface area of 40 m$^2$/g or more can be obtained. This is due to the fact that the graphite is exfoliated by stress when the first polymer adsorbed on the graphene of the graphite is pyrolyzed and disappears. According to the second invention, exfoliated graphite having a specific surface area of 100 m$^2$/g or more can be obtained.

The heating temperature in the above heating step can be the pyrolysis temperature of the first polymer or higher. In addition, the heating time can be the time that the first polymer can be sufficiently pyrolyzed, and can be about 30 minutes to 300 minutes. In this heating time range, it is possible to sufficiently pyrolyze the first polymer and obtain exfoliated graphite according to the second invention. In the second invention, the first polymer is removed by pyrolysis.

The above pyrolyzable foaming agent may be pyrolyzed at a temperature either lower or higher than the pyrolysis temperature by the polymer in the heating step. In other words, when the pyrolysis temperature of the pyrolyzable foaming agent is lower than the pyrolysis temperature of the first polymer, the pyrolyzable foaming agent is pyrolyzed at a temperature lower than the pyrolysis temperature of the polymer. When the pyrolysis temperature of the above pyrolyzable foaming agent is higher than the pyrolysis temperature of the polymer, the above composition can be heated to a temperature higher than the heating temperature in the heating step to pyrolyze the pyrolyzable foaming agent. In either case, foaming occurs by the pyrolysis of the pyrolyzable foaming agent, and exfoliated graphite having a larger specific surface area can be obtained.

(Repetition of Adsorption and Heating Steps)

In the method for producing exfoliated graphite according to the second invention, the exfoliated graphite obtained by the heating step as described above may be used as primary exfoliated graphite as a raw material. In this case, the step of preparing a composition which comprises primary exfoliated graphite and a first polymer and in which the first polymer is adsorbed on the primary exfoliated graphite, and the above heating step are carried out again. In this case, exfoliated graphite having a much larger specific surface area can be obtained. Further, the adsorption and heating steps may be further repeated using the exfoliated graphite obtained in this manner as primary exfoliated graphite that is a raw material. In this case, exfoliated graphite having a still larger specific surface area can sometimes be obtained.

Preferred Embodiment

In the method for producing exfoliated graphite according to the second invention, another exfoliating treatment may be further performed using the primary exfoliated graphite obtained by the heating step. Examples of such a method include a method further comprising the following steps.

The step of preparing a mixture comprising the obtained exfoliated graphite and a radical polymerizable monomer after the above heating step.

The step of polymerizing the above radical polymerizable monomer contained in the above mixture to form a second polymer in which the above radical polymerizable monomer is polymerized in the above mixture and graft the above second polymer on the above exfoliated graphite.

The second heating step of heating the above mixture to a temperature at which the above second polymer is pyrolyzed or higher to pyrolyze the above second polymer to obtain exfoliated graphite.

The above radical polymerizable monomer is not particularly limited as long as it is a monomer having a functional group generally known as radical polymerizable. A monomer having an appropriate radical polymerizable functional group similar to that of the above first invention can be used.

The blending ratio between the above exfoliated graphite and the above radical polymerizable monomer is not particularly limited and is desirably a ratio in the range of 1:1 to 1:100 in terms of a weight ratio. By setting the above blending ratio in the above range, it is possible to further exfoliate the above exfoliated graphite to obtain exfoliated graphite having a much larger specific surface area.

The step of preparing the above mixture is not particularly limited, and the obtained exfoliated graphite and the above radical polymerizable monomer can be mixed. Examples thereof include a method of dispersing the above exfoliated graphite in the above radical polymerizable monomer using the above radical polymerizable monomer as a dispersion medium. In addition, the above composition further comprising the above pyrolyzable foaming agent can be provided by dissolving or dispersing the above pyrolyzable foaming agent in the above radical polymerizable monomer.

Then, the third heating step of polymerizing the above radical polymerizable monomer to form a second polymer in which the above radical polymerizable monomer is polymerized in the above composition is performed.

This heating temperature can be a temperature at which the radical polymerizable monomer polymerizes spontaneously. Therefore, the heating temperature can be selected according to the type of the radical polymerizable monomer used. For example, the heating temperature can be a temperature of 110° C. to 150° C. in the case of styrene and a temperature of 320° C. to 350° C. in the case of glycidyl methacrylate. The heating time is not particularly limited and can be the time that the radical polymerizable monomer is sufficiently polymerized and the polymer is grafted on the exfoliated graphite. This heating time should usually be about 30 minutes to 300 minutes.

At this time, the above radical polymerizable monomer forms a free radical, and thus, the above radical polymerizable monomer undergoes radical polymerization, and thus, the second polymer in which the above radical polymerizable monomer is polymerized is formed. On the other hand, the above exfoliated graphite is a laminate of a plurality of graphene layers and therefore has radical trapping properties. Therefore, when the above radical polymerizable monomer is subjected to polymerization in the above composition comprising the above exfoliated graphite, the above free radical is adsorbed on the ends and surfaces of the graphene layers. Therefore, the above second polymer or the above radical polymerizable monomer having the above free radical formed during the polymerization is grafted on the ends and surfaces of the graphene layers of the above exfoliated graphite.

Examples of the method for polymerizing the above radical polymerizable monomer contained in the above composition include a method of heating the above composition to a temperature at which the above radical polymerizable monomer spontaneously initiates polymerization or higher. By heating the above composition to the above temperature or higher, a free radical can be formed in the above radical polymerizable monomer contained in the above composition. Thus, the above-described polymerization and grafting can be performed.

When the above radical polymerizable monomer is polymerized by heating as described above, both the polymerization of the above radical polymerizable monomer and the pyrolysis of the above second polymer described later can be performed by simply heating the above composition.

The above heating method is not particularly limited as long as it is a method that can heat the above composition to the above temperature or higher. The above composition can be heated by an appropriate method and apparatus. In addition, in the above heating, heating may be performed without sealing, that is, under atmospheric pressure.

In addition, in order to reliably polymerize the above radical polymerizable monomer, after the above composition is heated to a temperature equal to or higher than the temperature at which the above radical polymerizable monomer spontaneously initiates polymerization, the above temperature may be further maintained for a certain time. The time that the above composition is maintained around the above temperature is preferably in the range of 0.5 to 2 hours though depending on the type and amount of the radical polymerizable monomer used.

In the second heating step, the above mixture is heated to the temperature at which the second polymer is pyrolyzed or higher. Thus, the above second polymer contained in the above composition, the above second polymer grafted on the ends and surfaces of the graphene layers of the above exfoliated graphite, and the like are pyrolyzed. In the second invention, the pyrolysis temperature of the above second polymer refers to TGA measurement-dependent decomposition end point temperature. For example, when the second polymer is polystyrene, the pyrolysis temperature of the above second polymer is about 350° C. In addition, in the case of polyglycidyl methacrylate, the pyrolysis temperature of the above second polymer can be a temperature of 380° C. or higher. The heating time can be the time that the second polymer is heated by pyrolysis and at least most of it disappears, and can be about 30 minutes to 300 minutes.

At this time, when the above second polymer grafted on the ends and surfaces of the graphene layers of the above exfoliated graphite, and the like are pyrolyzed, peel force occurs between the above graphene layers. Therefore, by pyrolyzing the above second polymer and the like, the above exfoliated graphite can be exfoliated between the graphene layers of the above exfoliated graphite to obtain exfoliated graphite.

The heating method in the above second heating step is not particularly limited as long as it is a method that can heat the above composition to the pyrolysis temperature of the above second polymer. The above composition can be heated by an appropriate method and apparatus. In addition, in the above heating, heating may be performed without sealing, that is, under atmospheric pressure. Therefore, exfoliated graphite can be produced inexpensively and easily.

In order to reliably pyrolyze the above second polymer, after the above composition is heated to a temperature equal to or higher than the pyrolysis temperature of the above second polymer, the above temperature may be further maintained for a certain time. The time that the above composition is maintained around the above temperature is preferably in the range of 0.5 to 2 hours though depending on the type and amount of the radical polymerizable monomer used.

In addition, when the above radical polymerizable monomer is polymerized by heating in the step of forming the above second polymer, heat treatment in the step of forming the above second polymer, and heat treatment in the step of pyrolyzing the above second polymer described later may be continuously performed by the same method and apparatus.

Also when the above radical polymerizable monomer is used, the above-described pyrolyzable foaming agent may be further added to the above mixture.

By using the above radical polymerizable monomer and/or the above second polymer and the above pyrolyzable foaming agent in combination, the exfoliated graphite can be exfoliated much more effectively. The reason why the exfoliated graphite can be exfoliated much more effectively by such a method is not certain, but the following reason is considered. As described above, when the above radical polymerizable monomer forms a free radical, the above second polymer or the above radical polymerizable monomer having the above free radical formed during the polymerization is grafted on the ends and surfaces of the graphene layers of the above exfoliated graphite. Therefore, the above free radical is trapped in the graphene layers. On the other hand, the above pyrolyzable foaming agent has the property of high affinity for radicals and therefore is attracted to the free radical trapped in the graphene layers of the above exfoliated graphite in the above composition. Therefore, the above pyrolyzable foaming agent is easily pyrolyzed around the graphene lamination surfaces. Therefore, peel force can be effectively applied between the graphene layers of the above graphite by the pyrolysis of the above pyrolyzable foaming agent.

The pyrolysis of the above pyrolyzable foaming agent need not necessarily be performed in the step of pyrolyzing the above second polymer. For example, when the pyrolysis temperature of the above pyrolyzable foaming agent is lower than the temperature at which the above radical polymerizable monomer spontaneously initiates polymerization, the above pyrolyzable foaming agent may be pyrolyzed when the above radical polymerizable monomer is polymerized by heating in the step of forming the above second polymer. In addition, the pyrolysis of the above pyrolyzable foaming agent may be before the polymerization of the radical polymerizable monomer, after the polymerization, or simultaneous with the polymerization.

In addition, in order to reliably pyrolyze the above pyrolyzable foaming agent, after the above composition is heated to a temperature equal to or higher than the pyrolysis temperature of the above pyrolyzable foaming agent, the above temperature may be further maintained for a certain time. The time that the above composition is maintained around the above temperature is preferably in the range of 0.5 to 2 hours though depending on the type and amount of the pyrolyzable foaming agent used.

Another Preferred Embodiment

In the method for producing exfoliated graphite according to the second invention, in the step of preparing the composition as a raw material described above, primary exfoliated graphite obtained by another method may be used. In other words, the step of preparing the above composition may comprise the step of preparing a mixture comprising graphite and a radical polymerizable monomer, the step of polymerizing the above radical polymerizable monomer contained in the above mixture to form a second polymer in which the above radical polymerizable monomer is polymerized in the above mixture and graft the above second polymer on the above graphite, the third heating step of heating the above mixture to a temperature equal to or higher than the pyrolysis temperature of the above second polymer to pyrolyze the above second polymer, and the step of mixing primary exfoliated graphite obtained in the above third heating step and the above first polymer to obtain the above composition.

In this case, a mixture can be prepared as in the case of the method for further exfoliating exfoliated graphite, using the above-described radical polymerizable monomer, and the polymerization of the radical polymerizable monomer and the grafting of the second polymer can be carried out. Further, then, the third heating step of heating the mixture to a temperature equal to or higher than the pyrolysis temperature of the second polymer to pyrolyze the second polymer can be carried out like the above-described second heating step. Also in this case, exfoliated graphite having a large specific surface area can be obtained.

It is considered that exfoliating can be achieved by the pyrolysis of the above second polymer for the above-described reason, that is, because when the second polymer grafted on the graphite or exfoliated graphite is fired, large stress acts on the grafting point, and thus, the distance between the graphenes increases.

In this another preferred embodiment, the primary exfoliated graphite is used as a raw material as described above, and therefore, by preparing a composition in which the primary exfoliated graphite is adsorbed on the first polymer, and then carrying out the step of heating the composition to the pyrolysis temperature of the first polymer or higher according to the second invention, exfoliated graphite having a much larger specific surface area can be obtained.

(Exfoliated Graphite)

The exfoliated graphite of the second invention is obtained by pyrolyzing a polymer in a composition which comprises graphite or primary exfoliated graphite and the polymer and in which the polymer is fixed to the graphite or primary exfoliated graphite, to remove the polymer. The polymer used for exfoliation is not substantially contained in the exfoliated graphite of the second invention.

The exfoliated graphite obtained by the production method of the second invention is characterized by being relatively less likely to scatter than exfoliated graphite obtained by a conventionally known production method. Therefore, the exfoliated graphite obtained by the production method of the second invention is more easily handled than exfoliated graphite obtained by a conventional production method.

By grinding the above exfoliated graphite obtained by the production method of the second invention, exfoliated graphite having characteristics similar to those of exfoliated graphite obtained by a conventional production method can also be obtained.

In the method for producing exfoliated graphite according to the second invention, exfoliated graphite having a specific surface area of 40 $m^2/g$ or more can be obtained. Further, exfoliated graphite having a specific surface area of 100 $m^2/g$ or more can be obtained. Furthermore, exfoliated graphite having a specific surface area of 180 $m^2/g$ or more can be obtained.

The specific surface area of the exfoliated graphite obtained by the second invention is large, and therefore, the exfoliated graphite of the second invention is excellent in physical properties, such as elastic modulus, and electrical properties, such as electrical conductivity. Therefore, for example, by dispersing the exfoliated graphite of the present invention in a resin, a resin composite material excellent in rigidity and combustion resistance can be obtained.

In addition, it is also possible to further exfoliate the exfoliated graphite obtained by the second invention by a conventionally known exfoliation method to provide exfoliated graphite having a much larger specific surface area. The exfoliated graphite obtained by the second invention is thinner and has a larger specific surface area than usual graphite, and therefore, by using the above exfoliated graphite in a conventional exfoliation method, the above exfoliated graphite can be exfoliated more efficiently.

The first and second inventions will be clarified below by giving specific Examples and Comparative Example. The first and second inventions are not limited to the following Examples.

Example 1

1000 mg of expanded graphite (manufactured by TOYO TANSO CO., LTD., trade name "PF Powder 8," BET specific surface area=22 $m^2/g$), 2 g of ADCA having the structure represented by the above formula (1) (manufactured by EIWA CHEMICAL IND. CO., LTD, trade name "AC#R-3K," pyrolysis temperature 210° C.) as a pyrolyzable foaming agent, 10 g of a vinyl acetate polymer (SN-04T, manufactured by DENKA) as a radical polymerizable monomer, and 20 g of tetrahydrofuran were mixed to provide a mixture. Then, the above mixture was ultrasonically treated at 100 W and an oscillation frequency of 28 kHz for 120 minutes using an ultrasonic treatment apparatus (manufactured by Honda Electronics Co., Ltd.). Thus, a composition in which the above expanded graphite was dispersed in the above vinyl acetate polymer was obtained.

Then, the above composition was subjected to drying treatment at 80° C. for 2 hours and further heated to a temperature of 110° C. to completely dry the THF solution. The above composition was further maintained at a temperature of 230° C. for 2 hours. Thus, the above ADCA was pyrolyzed and foamed in the above composition.

Then, the above composition was further heated to a temperature of 500° C. and maintained for 2 hours. Thus, the vinyl acetate polymer in the above composition was pyrolyzed to obtain exfoliated graphite in which the above graphite was exfoliated.

Example 2

1000 mg of expanded graphite (manufactured by TOYO TANSO CO., LTD., trade name "PF Powder 8," BET specific surface area=22 $m^2/g$), 10 g of a glycidyl methacrylate polymer (manufactured by NOF CORPORATION, product number: G2050M, number average molecular weight=200000) as a radical polymerizable polymer, and 90 g of tetrahydrofuran were mixed to provide a mixture. Next, the above mixture was ultrasonically treated at 100 W and an oscillation frequency of 28 kHz for 5 hours using an ultrasonic treatment apparatus (manufactured by Honda Electronics Co., Ltd.). Thus, a composition in which the above expanded graphite was dispersed in the above glycidyl methacrylate polymer was obtained.

Next, the above composition was subjected to drying treatment at 80° C. for 2 hours and further heated to a temperature of 150° C. to completely dry the THF solution.

Then, the above composition was maintained at a temperature of 450° C. for 2 hours. Thus, the glycidyl methacrylate polymer in the above composition was pyrolyzed to obtain exfoliated graphite in which the above graphite was exfoliated.

Example 3

3000 mg of expanded graphite (manufactured by TOYO TANSO CO., LTD., trade name "PF Powder 8," BET specific surface area=22 $m^2/g$), 30 g of polybutyral (manufactured by SEKISUI CHEMICAL CO., LTD., product number: BL-1, and 270 g of tetrahydrofuran as a solvent were mixed to provide a raw material composition. Next, the raw material composition was irradiated with ultrasonic waves at 100 W and an oscillation frequency of 28 kHz for 2 hours using an ultrasonic treatment apparatus (manufactured by Honda Electronics Co., Ltd.). The polybutyral was adsorbed on the expanded graphite by this ultrasonic treatment. In this manner, a composition in which the polybutyral was adsorbed on the expanded graphite was provided.

After the above ultrasonic irradiation, the above composition was molded by a solution casting method, maintained at a drying temperature of 80° C. for 1 hour, and then maintained at a temperature of 110° C. for 1 hour to obtain a casting sheet having a thickness of 100 µm.

Next, the heating step of maintaining the sheet obtained by the casting at a temperature of 600° C. for 2 hours was carried out. Thus, the above polybutyral was pyrolyzed to obtain exfoliated graphite.

Example 4

10 g of expanded graphite (manufactured by TOYO TANSO CO., LTD., trade name "PF Powder 8," BET specific surface area=22 $m^2/g$), 200 g of polypropylene glycol (PPG, manufactured by Sanyo Chemical Industries, Ltd., product number: SANNIX GP-3000, number average molecular weight=3000), 20 g of ADCA having the structure represented by the above formula (1) (manufactured by EIWA CHEMICAL IND. CO., LTD, trade name "AC#R-3K," pyrolysis temperature 210° C.) as a pyrolyzable foaming agent, and 200 g of tetrahydrofuran as a solvent were mixed to provide a raw material composition. Next, the raw material composition was irradiated with ultrasonic waves at 100 W and an oscillation frequency of 28 kHz for 2 hours using an ultrasonic treatment apparatus (manufactured by Honda Electronics Co., Ltd.). The polypropylene glycol was adsorbed on the expanded graphite by this ultrasonic treatment. In this manner, a composition in which the polypropylene glycol was adsorbed on the expanded graphite was provided.

After the above ultrasonic irradiation, the above composition was molded by a solution casting method, maintained at a drying temperature of 80° C. for 2 hours, then maintained at a temperature of 110° C. for 1 hour, further maintained at a temperature of 150° C. for 1 hour, and further maintained at a temperature of 230° C. for 2 hours. Thus, the above ADCA was pyrolyzed and foamed in the above composition. Next, the heating step of maintaining the above composition at a temperature of 400° C. for 24 hours was carried out. Thus, the above polypropylene glycol was pyrolyzed to obtain exfoliated graphite.

Example 5

600 mg of expanded graphite (manufactured by TOYO TANSO CO., LTD., trade name "PF Powder 8," BET specific surface area=22 m$^2$/g), 1200 mg of ADCA having the structure represented by the above formula (1) (manufactured by EIWA CHEMICAL IND. CO., LTD, trade name "AC#R-3K," pyrolysis temperature 210° C.) as a pyrolyzable foaming agent, and 20 g of a styrene monomer (manufactured by Wako Pure Chemical Industries, Ltd.) as a radical polymerizable monomer were mixed to provide a mixture. Next, the above mixture was ultrasonically treated at 100 W and an oscillation frequency of 28 kHz for 120 minutes using an ultrasonic treatment apparatus (manufactured by Honda Electronics Co., Ltd.). Thus, a composition in which the above expanded graphite was dispersed in the above styrene monomer was obtained.

Next, the above composition was heated to a temperature of 120° C., maintained for 1 hour, and further maintained at a temperature of 150° C. for 1 hour. Thus, the styrene monomer in the above composition was polymerized.

Next, the above composition was further heated to a temperature of 230° C. and maintained at a temperature of 230° C. for 1 hour. Thus, the above ADCA was pyrolyzed and foamed in the above composition.

Then, the above composition was further heated to a temperature of 450° C. and maintained at a temperature of 450° C. for 2 hours. Thus, the polymer in which the styrene monomer was polymerized in the above composition was pyrolyzed to obtain exfoliated graphite.

Comparative Example

The expanded graphite (manufactured by TOYO TANSO CO., LTD., trade name "PF Powder 8") before exfoliation used in Example 1 was taken as the graphite of Comparative Example.

[Evaluation of Examples and Comparative Example]
1) TG/DTA Measurement
(a) Measurement for Pyrolyzable Foaming Agent A combustion test was performed in which the ADCA used as the pyrolyzable foaming agent in Example 1 was heated from 30° C. to 1000° C. at a rate of 10° C./min under an air atmosphere. The TG/DTA measurement results when this combustion test was performed are shown in FIG. 1.

A decrease in weight due to the decomposition of the ADCA was confirmed around 200° C. to 230° C. in FIG. 1 from the TG curve. In addition, a peak derived from the decomposition of the ADCA was confirmed around 200° C. to 230° C. in the DTA curve.

(b) Measurement for Expanded Graphite as Raw Material

A combustion test was performed in which the expanded graphite (manufactured by TOYO TANSO CO., LTD., trade name "PF Powder 8") as a raw material used in Example 1 was heated from 30° C. to 1000° C. at a rate of 10° C./min under an air atmosphere. The TG/DTA measurement results when this combustion test was performed are shown in FIG. 2.

(c) Measurement for Obtained Exfoliated Graphites

A combustion test was performed in which the exfoliated graphites obtained by Examples 1 to 5 were heated from 30° C. to 1000° C. at a rate of 10° C./min under an air atmosphere. The TG/DTA measurement results when this combustion test was performed are shown in FIGS. 3 to 7.

It was observed that the decomposition end point temperature was lower than that of the original expanded graphite in all TG curves in FIGS. 3 to 7. The decomposition end point temperature lowering is considered as the original graphite being exfoliated as a whole.

In addition, from FIGS. 3 to 7, it is found that the resins are burned off and disappear in the obtained exfoliated graphites.

2) Measurement of BET Specific Surface Area

For the above exfoliated graphites obtained by Examples 1 to 5 and the graphite of Comparative Example, BET specific surface area was measured as an indicator of exfoliation properties by a specific surface area measuring apparatus ASAP-2000 manufactured by SHIMADZU CORPORATION using a nitrogen gas. The results are shown in the following Table 1.

3) XRD Measurement

The XRD spectrum of the exfoliated graphite obtained by Example 2 is shown by the solid line in FIG. 8. The broken line in FIG. 8 is the XRD spectrum of the original expanded graphite (PF-8) used as a raw material. The XRD spectrum of the exfoliated graphite obtained by Example 4 is shown by the solid line in FIG. 9. The broken line in FIG. 9 is the XRD spectrum of the original expanded graphite (PF-8) used as a raw material.

As is clear from FIG. 8 and FIG. 9, it is observed that the crystallization peak intensity of the graphite structure of the original expanded graphite decreases by exfoliation treatment.

4) Observation by SEM

The above exfoliated graphites obtained by Examples 1 to 5 were magnified 1000 times and photographed by a scanning electron microscope (SEM), and the thus obtained photographs were observed. The above SEM photographs of the above exfoliated graphites obtained by Examples 1 to 5 are shown in FIGS. 10 to 15.

In addition, as is also clear from FIGS. 10 to 15, it is found that exfoliated graphites that were thin and had a large specific surface area were obtained by the production methods of Examples 1 to 5 according to the present invention.

TABLE 1

| | specific surface area (m$^2$/g) |
|---|---|
| Ex. 1 | 28 |
| Ex. 2 | 27 |
| Ex. 3 | 37 |

TABLE 1-continued

| | specific surface area (m²/g) |
|---|---|
| Ex. 4 | 37 |
| Ex. 5 | 37 |
| Comp. Ex. | 20 |

The invention claimed is:

1. A method for producing exfoliated graphite, comprising steps of:
preparing a composition which comprises graphite or primary exfoliated graphite and a polymer and in which the polymer is fixed to the graphite or primary exfoliated graphite; and
pyrolyzing the polymer contained in the composition to exfoliate the graphite or primary exfoliated graphite and remove the polymer by burning the polymer off such that it disappears through pyrolysis of the polymer,
wherein in the step of preparing the composition, the polymer is grafted on the graphite or primary exfoliated graphite in the composition in which the polymer is fixed to the graphite or primary exfoliated graphite.

2. The method for producing exfoliated graphite according to claim 1, wherein the step of preparing the composition comprises:
a step of preparing a mixture comprising the graphite or primary exfoliated graphite and a radical polymerizable monomer, and
a step of polymerizing the radical polymerizable monomer contained in the mixture to form a polymer in which the radical polymerizable monomer is polymerized in the mixture and graft the polymer on the graphite or primary exfoliated graphite.

3. The method for producing exfoliated graphite according to claim 2, wherein in the step of preparing the mixture, the mixture further comprises a pyrolyzable foaming agent.

4. The method for producing exfoliated graphite according to claim 3, wherein in the step of forming the polymer and grafting the polymer on the graphite or primary exfoliated graphite, the pyrolyzable foaming agent contained in the mixture is pyrolyzed.

5. The method for producing exfoliated graphite according to claim 2, wherein the step of forming the polymer and grafting the polymer on the graphite or primary exfoliated graphite is performed by heating the mixture to polymerize the radical polymerizable monomer contained in the mixture.

6. The method for producing exfoliated graphite according to claim 1, wherein in the step of preparing the composition, the polymer is heated to a temperature in a temperature range of 50° C. or higher and 400° C. or lower in the presence of the graphite or primary exfoliated graphite to graft the polymer on the graphite.

7. The method for producing exfoliated graphite according to claim 1, wherein in the step of preparing the composition, the composition further comprises a pyrolyzable foaming agent.

8. The method for producing exfoliated graphite according to claim 7, wherein in the step of pyrolyzing the polymer to exfoliate the graphite or primary exfoliated graphite, the pyrolyzable foaming agent contained in the composition is pyrolyzed.

9. The method for producing exfoliated graphite according to claim 1, wherein in the step of preparing the composition, the composition in which the polymer is fixed to the graphite or primary exfoliated graphite, comprising graphite or primary exfoliated graphite and a first polymer, the first polymer being adsorbed on the graphite or primary exfoliated graphite, is prepared, and
in the step of exfoliating the graphite or primary exfoliated graphite, a heating step of heating the composition to a temperature equal to or higher than a pyrolysis temperature of the first polymer to pyrolyze the first polymer to obtain exfoliated graphite is performed.

10. The method for producing exfoliated graphite according to claim 9, wherein the first polymer is at least one polymer selected from the group consisting of polyvinyl acetate, polybutyral, and polypropylene glycol.

11. The method for producing exfoliated graphite according to claim 10, wherein in the step of preparing the composition, the composition further comprises a pyrolyzable foaming agent.

12. The method for producing exfoliated graphite according to claim 10, wherein the exfoliated graphite obtained by the method for producing exfoliated graphite according to claim 9 is used as the primary exfoliated graphite.

13. The method for producing exfoliated graphite according to claim 12, wherein
a step of adsorbing the first polymer on the primary exfoliated graphite using as the primary exfoliated graphite the exfoliated graphite obtained by the method for producing exfoliated graphite according to claim 12, to prepare the composition, and
a heating step of heating the provided composition to a temperature equal to or higher than the pyrolysis temperature of the first polymer to pyrolyze the first polymer to obtain exfoliated graphite, are further repeated.

14. The method for producing exfoliated graphite according to claim 9, further comprising:
a step of preparing a mixture comprising the obtained exfoliated graphite and a radical polymerizable monomer after the heating step;
a step of polymerizing the radical polymerizable monomer contained in the mixture to form a second polymer in Which the radical polymerizable monomer is polymerized in the mixture and graft the second polymer on the exfoliated graphite; and
a second heating step of heating the mixture to a temperature at which the second polymer is pyrolyzed or higher to pyrolyze the second polymer to further exfoliate the exfoliated graphite.

15. The method for producing exfoliated graphite according to claim 9, wherein the step of preparing the composition comprises:
a step of preparing a mixture comprising graphite and a radical polymerizable monomer,
a step of polymerizing the radical polymerizable monomer contained in the mixture to form a second polymer in which the radical polymerizable monomer is polymerized in the mixture and graft the second polymer on the graphite,
a third heating step of heating the mixture to a temperature equal to or higher than a pyrolysis temperature of the second polymer to pyrolyze the second polymer, and
a step of mixing primary exfoliated graphite obtained in the third heating step and the first polymer to obtain the composition.

16. The method for producing exfoliated graphite according to claim 3, wherein the pyrolyzable foaming agent is at least one heat foaming agent selected from the group consisting of compounds having structures represented by the following formula (1) to formula (4)

[Formula 1]

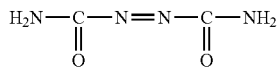

Formula (1)

[Formula 2]

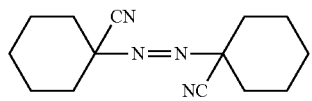

Formula (2)

[Formula 3]

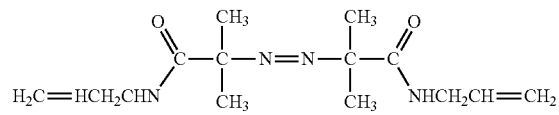

Formula (3)

[Formula 4]

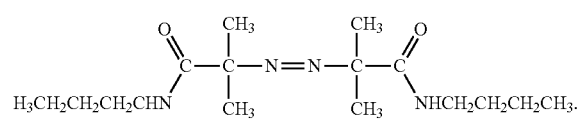

Formula (4)

17. The method for producing exfoliated graphite according to claim 3, wherein in the step of exfoliating the graphite or primary exfoliated graphite, the pyrolyzable foaming agent contained in the mixture is pyrolyzed.

18. The method for producing exfoliated graphite according to claim 2, wherein the radical polymerizable monomer is styrene or glycidyl methacrylate.

19. Exfoliated graphite obtained by a method for producing exfoliated graphite comprising the steps of:
preparing a composition which comprises graphite or primary exfoliated graphite and a polymer and in which the polymer is fixed to the graphite or primary exfoliated graphite between layers of the graphite or primary exfoliated graphite at an edge portion of the graphite or primary exfoliated graphite; and
pyrolyzing the polymer contained in the composition to exfoliate the edge portion of the graphite or primary exfoliated graphite and remove the polymer by burning the polymer off such that it disappears through pyrolysis of the polymer,
wherein in the step of preparing the composition, the polymer is grafted on the graphite or primary exfoliated graphite in the composition in which the polymer is fixed to the graphite or primary exfoliated graphite,
wherein a central portion of the exfoliated graphite has a graphite structure and the edge portion of the exfoliated graphite has an exfoliated structure, and
wherein an original configuration of the graphite or primary exfoliated graphite used to prepare the composition remains present and unaltered in the central portion of the exfoliated graphite.

20. Exfoliated graphite obtained by a method for producing exfoliated graphite comprising the steps of:
preparing a composition which comprises graphite or primary exfoliated graphite having a graphite structure and a polymer and in which the polymer is fixed to the graphite or primary exfoliated graphite between layers of the graphite or primary exfoliated graphite at an edge portion of the graphite or primary exfoliated graphite; and
pyrolyzing the polymer contained in the composition to exfoliate the edge portion of the graphite or primary exfoliated graphite and remove the polymer by burning the polymer off such that it disappears through pyrolysis of the polymer,
wherein in the step of preparing the composition, the polymer is grafted on the graphite or primary exfoliated graphite in the composition in which the polymer is fixed to the graphite or primary exfoliated graphite,
wherein a central portion of the exfoliated graphite retains the graphite structure and the edge portion of the exfoliated graphite has an exfoliated structure, and
wherein an original configuration of the graphite or primary exfoliated graphite used to prepare the composition remains present and unaltered in the central portion of the exfoliated graphite.

* * * * *